(12) United States Patent
Naito et al.

(10) Patent No.: US 6,765,700 B1
(45) Date of Patent: Jul. 20, 2004

(54) METHOD FOR DETECTING AND CONTROLLING HOME POSITION OF IMAGE READER

(75) Inventors: Mitsuhiro Naito, Zama (JP); Yasuyuki Ohiwa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/372,564

(22) Filed: Aug. 11, 1999

(30) Foreign Application Priority Data

Aug. 20, 1998 (JP) .......................................... 10-234117
Aug. 20, 1998 (JP) .......................................... 10-234118
Aug. 20, 1998 (JP) .......................................... 10-234119
Sep. 30, 1998 (JP) .......................................... 10-278125

(51) Int. Cl.$^7$ .............................................. H04N 1/04
(52) U.S. Cl. .......................... 358/486; 358/406; 358/474
(58) Field of Search ........................ 358/474, 1.4, 1.12, 358/505, 513, 461, 462, 494, 406, 486; 382/274

(56) References Cited

U.S. PATENT DOCUMENTS

| | | | | |
|---|---|---|---|---|
| 4,634,885 A | * | 1/1987 | Inoue ........................... | 250/578 |
| 5,493,415 A | * | 2/1996 | Mita et al. ..................... | 358/44 |
| 5,864,408 A | * | 1/1999 | Kumashiro ................. | 358/461 |

FOREIGN PATENT DOCUMENTS

JP         408018748 A   *   1/1996   ............ H04N/1/19

* cited by examiner

Primary Examiner—Kimberly Williams
Assistant Examiner—Negussie Worku
(74) Attorney, Agent, or Firm—Morgan & Finnegan, L.L.P.

(57) ABSTRACT

The present invention relates to a method for controlling an image scanner for reading images by moving an image sensor. Specifically, the present invention relates to a control method for detecting the boundary between a white region and a black region formed at a predetermined place in accordance with a signal output from the image sensor and determining the home position of the image sensor in accordance with the position of the boundary. Particularly, the present invention is an invention for providing a control method for preventing erroneous recognition due to influence of external light.

The above objects are achieved by methods of the present invention such as a method for confirming whether, when an output signal probably showing a black region is obtained, the same detection result is obtained again at another position in the black region, a method for excluding the vicinity of a housing end subject to external light from a read range, and a method for previously generating a threshold for detecting a black region in accordance with a signal output from an image sensor to use the value of the signal.

32 Claims, 18 Drawing Sheets

107 PRESSURE PLATE

109 READ DIRECTION

104

105

101 CONTACT-TYPE IMAGE SENSOR (CIS)

106 CONTACT GLASS

107

108 MANUSCRIPT TO BE READ

106

103

101

102

METHOD FOR DETECTING AND CONTROLLING HOME POSITION OF IMAGE READER

BACKGROUND OF THE INVENTION

The present invention relates to an image reader capable of reading an image with an image sensor for converting a read image into an electric video signal and transferring a video signal obtained by digitizing the electric video signal with an A/D converter to an external unit and its control method and an image read method.

An image reader (hereafter referred to as image scanner) has been known so far, which reads a manuscript with an image sensor to convert it into an electric video signal and moreover, converts the analog signal into a digital signal with an A/D converter to transfer it to an external unit.

This type of the image scanner has a home-position sensor (hereafter referred to as HP sensor) for detecting the position of an image sensor in accordance with on/off of the output of a photodiode or the like when moving the image sensor for scanning a manuscript to a read start position (hereafter referred to as home position) in order to determine an image read start position and determines the read start position with the home position sensor.

Moreover, a product has been recently marketed which detects a home position (hereafter referred to as HP detection) without using the above photodiode in order to cut down the cost of a scanner. In the case of this type of the product, a specific pattern is set to the read start position of a scanner to decide a reference position by detecting the pattern.

For example, a white plate and a black plate are arranged out of an image region adjacently to each other and the region is read by an image sensor to detect the boundary between the white plate and the black plate in accordance with the output of the image sensor and perform HP detection.

Moreover, it is also performed to combine detection of the above pattern with a HP sensor, move an image sensor up to the position of the HP sensor, and then detect the boundary between a white plate and a black plate.

However, the above detection methods have the following problems.

(1) The gap between a pressure plate and a housing (a body of a scanner) may be erroneously detected as the boundary between a white plate and a black plate.

(2) Because external light comes in from the gap between a pressure plate and a housing, the boundary between a white plate and a black plate is not accurately detected.

(3) When using a HP sensor, HP detection cannot be made if the HP sensor is damaged or external light enters the read region of an image scanner.

(4) By using a complex pattern as a specific pattern, accurate HP detection can be made. However, when using an inexpensive scanner, it is necessary to perform HP detection only from a simple black region in order to further cut down the cost before setting a complex pattern. However, the processing section (CPU) for performing the detection frequently has a low performance and therefore, it is difficult to decide whether pattern data values are matched each other at a high speed.

Moreover, it is limited to perform complex processing. Therefore, erroneous detection may occur depending on the manuscript on a manuscript table and an image sensor may stop at a position other than a reference position.

SUMMARY OF THE INVENTION

The present invention is made to solve the above problems and its object is to provide an image scanner for performing HP detection by detecting the boundary between a white plate and a black plate without erroneously detecting the boundary between a pressure plate and a housing as the boundary between the white plate and the black plate. It is another object of the present invention to provide a method for controlling an image scanner for performing HP detection by detecting the boundary between a white plate and a black plate, capable of reducing a scan time.

It is still another object of the present invention to provide an image scanner for performing HP detection by detecting the boundary between a white plate and a black plate, capable of accurately performing HP detection without being influenced by external light incoming from the gap between a pressure plate and a housing.

It is still another object of the present invention to provide a method for controlling an image scanner capable of accurately performing HP detection even when intensities of external light are changed by operator's setting a read range of an image sensor through an external unit.

It is still another object of the present invention to provide a method for controlling an image scanner capable of accurately performing HP detection even if a HP sensor is damaged or external light enters a read region of an image scanner.

That is, according to the first aspect of the present invention, it is possible to obtain a method for controlling an image scanner for reading an image from an image read region by scanning the region with an image sensor in a predetermined direction and having transfer means for transferring a video signal to an external unit and a white portion and a black portion which can be read by the image sensor and which are formed out of the image read region; wherein the steps of obtaining a video signal converted by the image sensor again at a position a predetermined distance separated smaller than the width of the predetermined direction of the black portion with the image sensor and deciding whether a black decision level is continuously satisfied when the level of the video signal is equal to a level satisfying the black decision level for deciding a predetermined-density black color are included to detect the read reference position of the image sensor by detecting the boundary between the white portion and the black portion with the image sensor.

Moreover, according to the second aspect of the present invention, it is possible to obtain a storage medium storing a program for detecting the boundary between a white portion and a black portion formed out of an image read region in which data can be read by an image sensor in an image scanner for reading an image from the image read region by scanning the region with the image sensor in a predetermined direction, wherein a program is stored which includes the steps of obtaining a video signal converted by the image sensor again at a position a predetermined distance separated smaller than the width of the predetermined direction of the black portion with the image sensor and deciding whether a black decision level is continuously satisfied when the level of the video signal is equal to a level satisfying the black decision level for deciding a predetermined-density black color in order to detect the read reference position of the image sensor by detecting the boundary between the white portion and the black portion with the image sensor.

Furthermore, according to the third aspect of the present invention, it is possible to obtain a method for controlling an image scanner having an image sensor for converting a read image into an electric video signal, transfer means for transferring the video signal to an external unit, and a white portion and a black portion out of an image read region; wherein the read range of the image sensor in the main scanning direction is made different from an image read range when detecting a reference position of the image sensor by detecting the boundary between the white portion and the black portion with the image sensor.

Furthermore, according to the fourth aspect of the present invention, it is possible to obtain a storage medium storing a program for detecting the boundary between a white portion and a black portion formed out of a region in which data can be read by an image sensor in a image scanner for reading an image from an image read region by scanning the region with the image sensor in a predetermined direction; wherein a program is stored which includes the step of making the read range of the image sensor in the main scanning direction different from an image read range when detecting the read reference position of the image sensor by detecting the boundary between the white portion and the black portion with the image sensor.

Furthermore, according to the fifth aspect of the present invention, it is possible to obtain a method for controlling an image scanner having an image sensor for converting a read image into an electric video signal, transfer means for transferring the video signal to an external unit, and a white portion and a black portion out of an image read region, wherein the black level of an output of the image sensor is set before detecting a read reference position of the image sensor in order to detect the reference position by detecting the white portion and the black portion with the image sensor.

Furthermore, according to the sixth aspect of the present invention, it is possible to obtain a storage medium storing a program for controlling an image scanner having an image sensor for converting a read image into an electric video signal, transfer means for transferring the video signal to an external unit, and a white portion and a black portion out of an image read region; wherein a program is stored which includes the step of setting the black level of the output of the image sensor before detecting a read reference position of the image sensor in order to detect the reference position by detecting the boundary between the white portion and the black portion with the image sensor.

Furthermore, according to the seventh aspect of the present invention, it is possible to obtain an image scanner for reading images from a manuscript every line by transferring an image sensor in the vertical-scanning direction, which comprises detection means for detecting a predetermined pattern for the image sensor to read an image, control means for determining the reference position of the image sensor to make the image sensor start reading an image in accordance with the detected pattern, and storage means for storing the detected pattern and the determined reference position, wherein initialization movement of the image sensor before image read when a power supply is turned on is performed in accordance with the reference position determined by the detected pattern in the vertical-scanning direction and movement of the image sensor after image read is performed in accordance with a reference position read out of the storage means.

Furthermore, according to the eighth aspect of the present invention, it is possible to obtain an image read method for reading images from a manuscript every line by transferring an image sensor in the vertical-scanning direction, which comprises the steps of detecting a predetermined pattern provided for the image sensor to read an image, determining the reference position of the image sensor in accordance with the detected pattern to make the image sensor start reading an image, storing the detected pattern and determined reference position in storage means, performing the initialization movement of the image sensor before image read when a power supply is turned on in accordance with the reference position determined by the pattern detected in the vertical-scanning direction, and performing the movement of the image sensor after image read in accordance with the reference position read out of the storage means.

Furthermore, according to the ninth aspect of the present invention, it is possible to obtain a storage medium storing a program for reading images from a manuscript every line by transferring an image sensor in the vertical-scanning direction, wherein a program is stored which detects a predetermined pattern for the image sensor to read an image, determines the reference position of the image sensor in accordance with the detected pattern to make the image sensor start reading an image, stores the detected pattern and determined reference position in storage means, performs the initialization movement of the image sensor before image read when a power supply is turned on in accordance with the reference position determined by the detected pattern in the vertical-scanning direction, and performs the movement of the image sensor after image read in accordance with the reference position read out of the storage means.

DETAILED DESCRIPTION OF THE PREFERRED EMBODIMENTS

The preferred embodiments of the present invention are described below by referring to the accompanying drawings.
(First embodiment)
(Configuration)

Figure 1A:
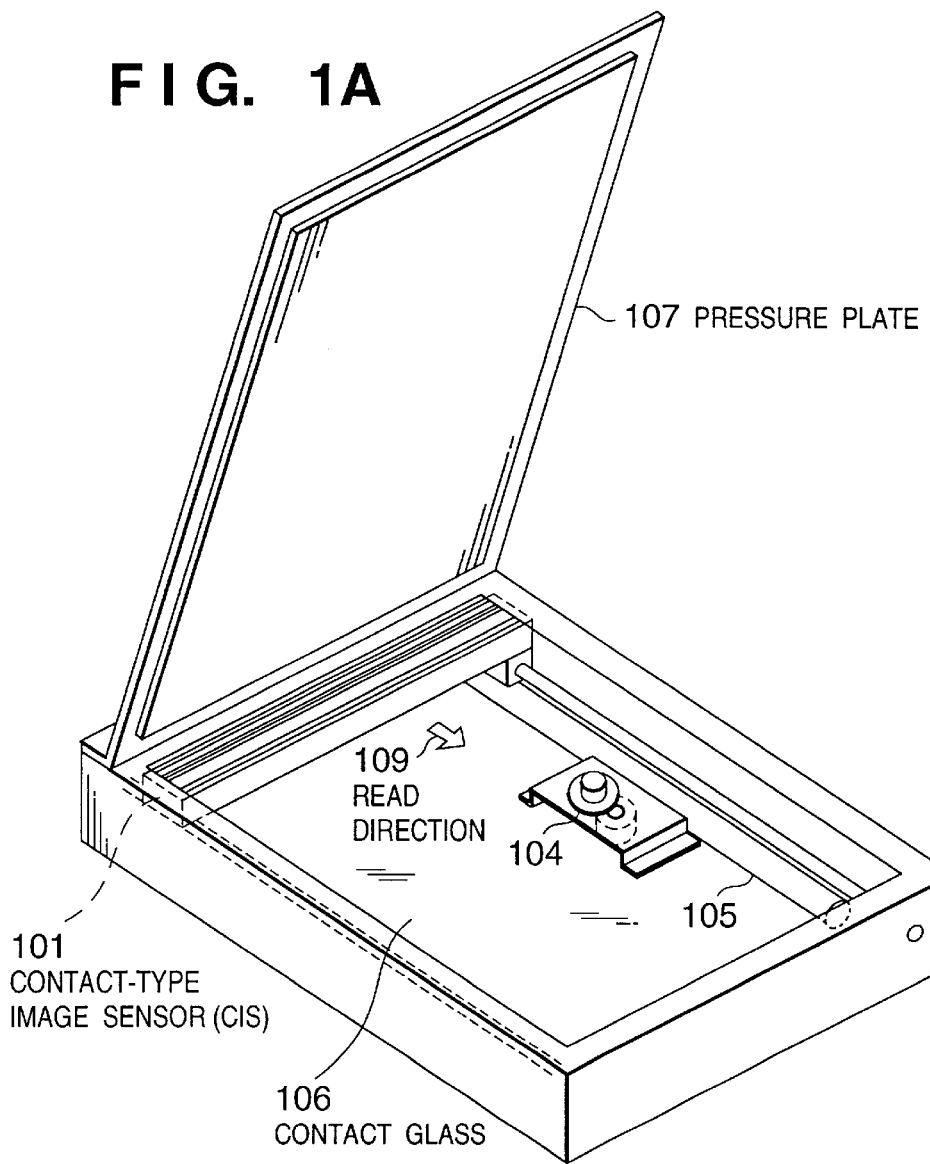
FIGS. 1A and 1B are illustrations showing the configuration of an image scanner of the present invention.
Figure 1B:
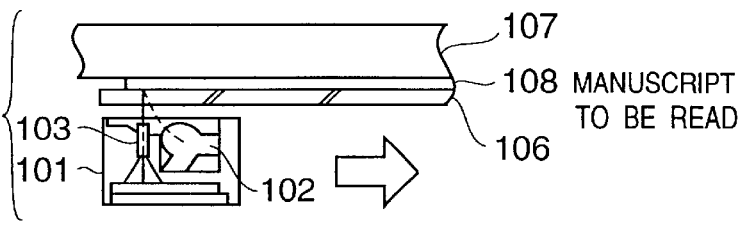

FIGS. 1a and 1b are illustrations of the configuration of first embodiment of an image scanner of the present invention, in which FIG. 1a is a perspective view of the outline of the image scanner and FIG. 1b is a side view of an essential portion of the image scanner.

In FIGS. 1a and 1b, reference number 101 denotes a contact-type contact image sensor (hereafter referred to as CIS), in which a luminous flux emitted from a LED (not illustrated) illuminates a manuscript surface linearly converted by a light guide 102. The light reflected from the illuminated manuscript is condensed on a line sensor by a lens array 103.

By driving a driving motor 104 and moving a CIS 101 in a read direction through a wire 105, it is possible to read images on the manuscript.

In FIG. 1, reference number 106 denotes a contact glass, 107 denotes a pressure plate, 108 denotes a read manuscript, and an arrow 109 denotes a read direction.
(Control Circuit)

Figure 2:
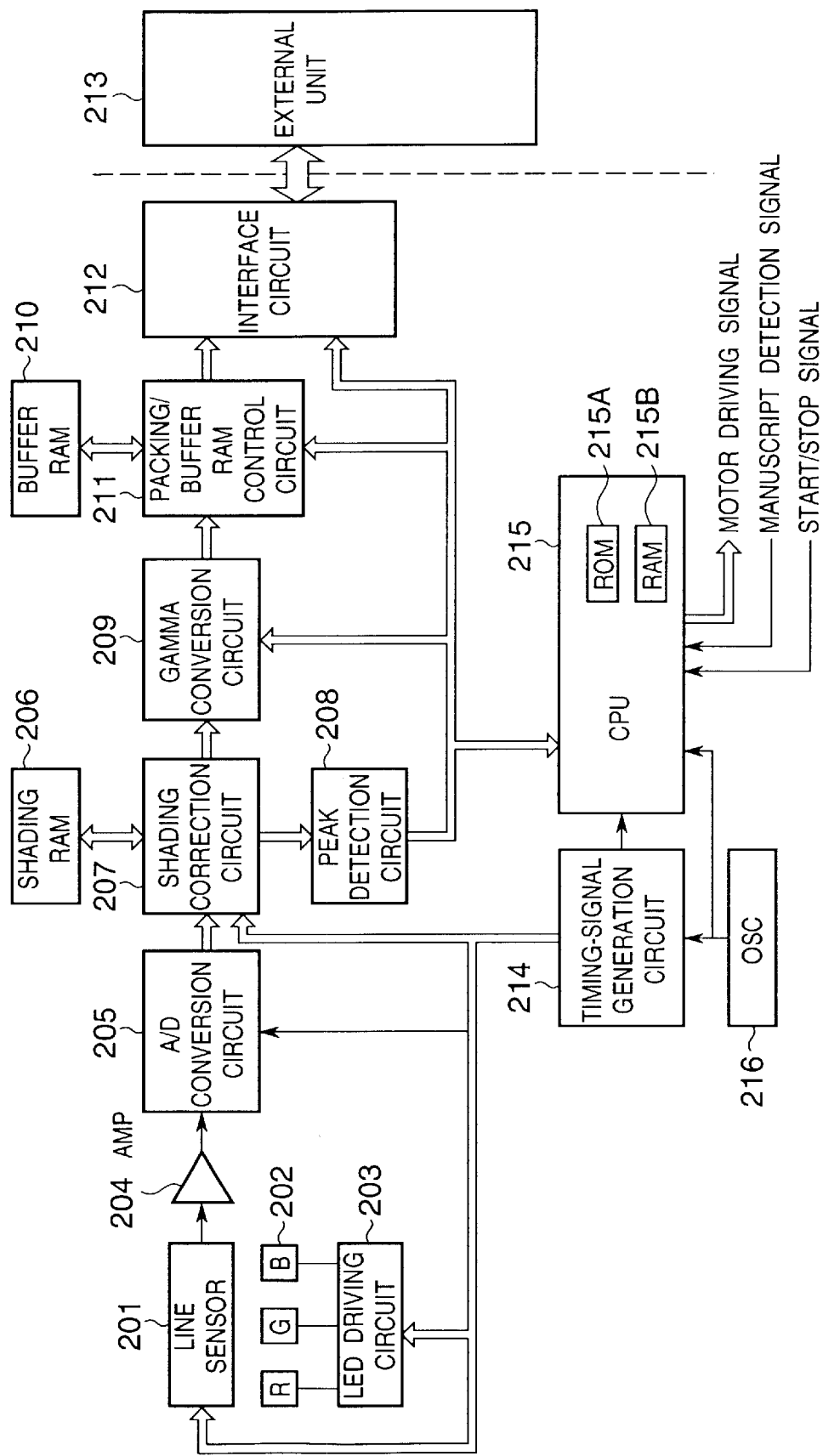
FIG. 2 is a block diagram showing the configuration of a control circuit.

FIG. 2 is a block diagram showing the configuration of a control circuit of this embodiment of the present invention. Circuit operations of this embodiment are described below by referring to FIG. 2. In FIG. 2, reference number 201 denotes a line sensor. Reference number 202 denotes color LEDs of R, G, and B serving as light sources which are integrated with the lens array 103 and line sensor 201 to constitute a CIS (scan bar) 101. By switching the LEDs of various colors every line to turn them on by an LED driving circuit 203 while moving the CIS 101 (FIG. 1), it is possible to read color images of R, G, and B lines in order.

Reference number 204 denotes an amplifier (AMP) for amplifying a signal output from the line sensor 201 and 205 denotes an A/D conversion circuit for obtaining, for example, an 8-bit digital output by A/D-converting the amplified output.

Shading correction data obtained by previously reading data from a calibration sheet and computing the data is stored in a shading RAM 206 and a shading correction circuit 207 performs shading correction of a video signal read by the CIS 101 in accordance with the data stored in the shading RAM 206.

A peak detection circuit 208 is a circuit for detecting the peak value of read video data every line, which is used to detect a read start position.

A gamma conversion circuit 209 performs gamma conversion of the video data read in accordance with a gamma curve preset by a host computer (not illustrated).

A buffer RAM 210 is a RAM for temporarily storing video data in order to adjust the timing of an actual read operation to the timing of communication with the host computer and a packing/buffer RAM control circuit 211 performs packing conforming to an image output mode (binary value, 4-bit multiple value, 8-bit multiple value, and 24-bit multiple value) preset by the host computer and thereafter, writes the data in the buffer RAM 210 and makes an interface circuit 212 read video data from the buffer RAM 210 and output the video data.

The interface circuit 212 transfers a control signal to and from an external unit 213 serving as the host unit of the image scanner of this embodiment such as a host computer and outputs a video signal.

Reference number 215 denotes a microcomputer-like CPU having a ROM 215A storing processing means and a RAM 215B for operations to control various sections in accordance with the procedure stored in the ROM 215A.

Reference number 216 denotes a crystal oscillator (OSC) and 214 denotes a timing-signal generation circuit for generating various timing signals by frequency-dividing an output of an oscillator (OSC) 216 in accordance with the setting of the CPU 215.

Figure 3:
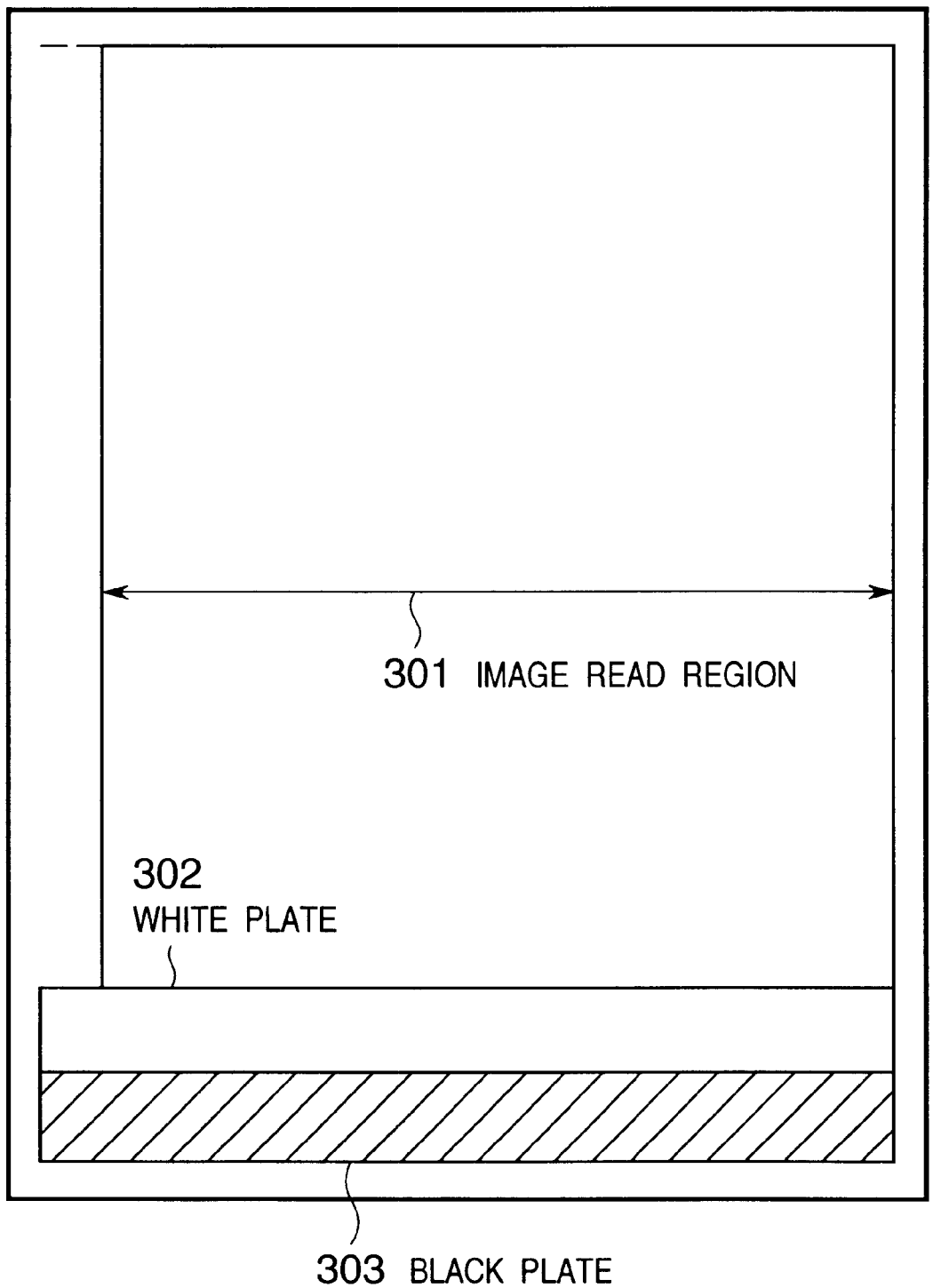
FIG. 3 is an illustration showing the configuration of a home-position detecting section of the image scanner of first embodiment.

FIG. 3 shows an illustration viewed from the inside of an image scanner upward (direction of the contact glass 106). Reference number 301 denotes the width of an image read region. Reference number 302 denotes a white plate and 303 denotes a black plate. The boundary between the white plate 302 and the black plate 303 is detected in accordance with a video signal when a line sensor read the plates 302 and 303 to detect a home position which is the read reference position of an image sensor.
(Operation Control)

Figure 4:
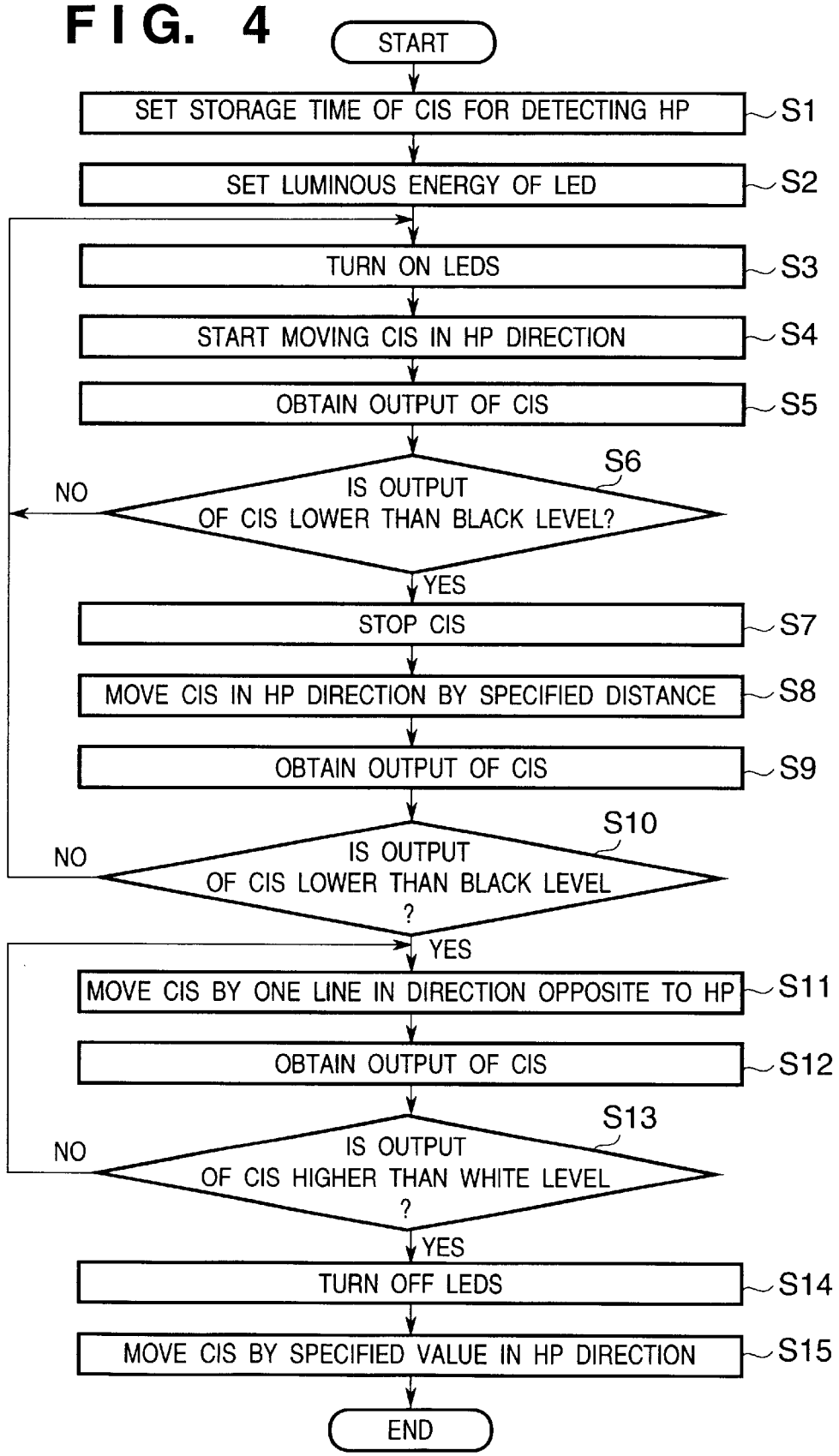
FIG. 4 is a flow chart showing a home-position detection control sequence of the first embodiment.

Then, a method for controlling operations of this embodiment is described below by referring to the operation control sequence flow chart in FIG. 4.

First, in step Si, the storage time of the CIS 101 (FIG. 1) for detecting a home position (HP) is set. Then, the luminous energy of an LED is set in step S2 to turn on the LED in step S3. In step S4, movement in the home-position direction of the CIS 101 (movement from the upper side to the lower side in FIG. 3) is started in step S4 to obtain the output of the CIS 101 in step S5.

Then, in step S6, the output of the CIS 101 is compared with a black decision level. When the output of the CIS 101 is lower than the black decision level, that is, when the output satisfies a predetermined black decision level, step S7 is started but step S3 is started when the output does not satisfy the level.

CIS 101 is stopped in step S7 and is moved by the determined length in step S8 to obtain the output of the CIS 101 in step 9. In step 10, the output of the CIS 101 obtained in step 9 is compared with a black decision level. When the output of the CIS 101 is lower then the black decision level, step S11 is started but step S3 is started in a case other than above.

The CIS 101 is moved by one line in the direction opposite to the home position HP (upward in FIG. 3) in step S11 to obtain the output of the CIS 101 in step S12.

In step S13, the output of the CIS 101 obtained in step S12 is compared with a white decision level. When the output of the CIS 101 is higher than the white decision level, that is, when a predetermined white decision level is satisfied and a boundary is detected, step S14 is started but step S11 is started in a case other than the above.

Each LED 202 (FIG. 2) is turned off in step S14 and the CIS 101 is moved by a specified distance toward the home position HP in step S15 to complete the processing by assuming the position as the home position HP.

Thus, this embodiment makes it possible to greatly decrease the probability of erroneously recognizing the gap between a pressure plate and a housing as the boundary between a white region and a black region by moving an image sensor by a predetermined distance in the forward direction, confirming that block is repeatedly detected, and then moving the image sensor in the reverse direction to detect white.
(Second Embodiment)

Then, the second embodiment of the present invention is described below.

Figure 5:
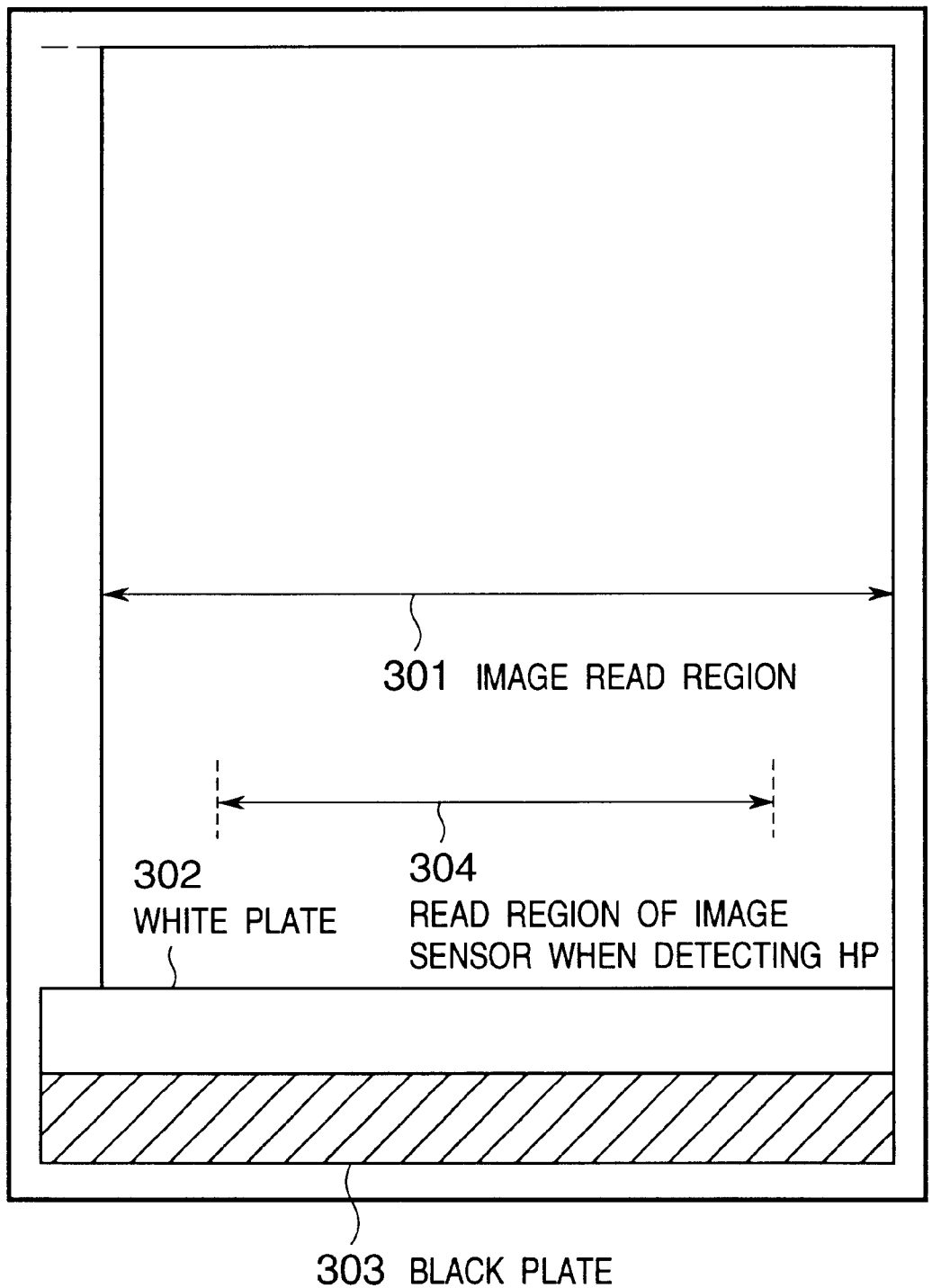
FIG. 5 is an illustration showing the configuration of a home-position detecting section of the image scanner of second embodiment.

FIG. 5 is an illustration viewed from the inside of an image scanner upward (direction of a contact glass 106) and a component same as that of the first embodiment in FIG. 3 is provided with the same reference number.

Similarly to the case of the first embodiment, this embodiment detects the boundary between the white plate 302 and the-black plate 303 in accordance with a video signal output from a line sensor and detects a home position HP serving as a read reference position of the image sensor. Reference number 304 denotes a read region of a CIS in the main scanning direction when detecting the HP.

Figure 6:
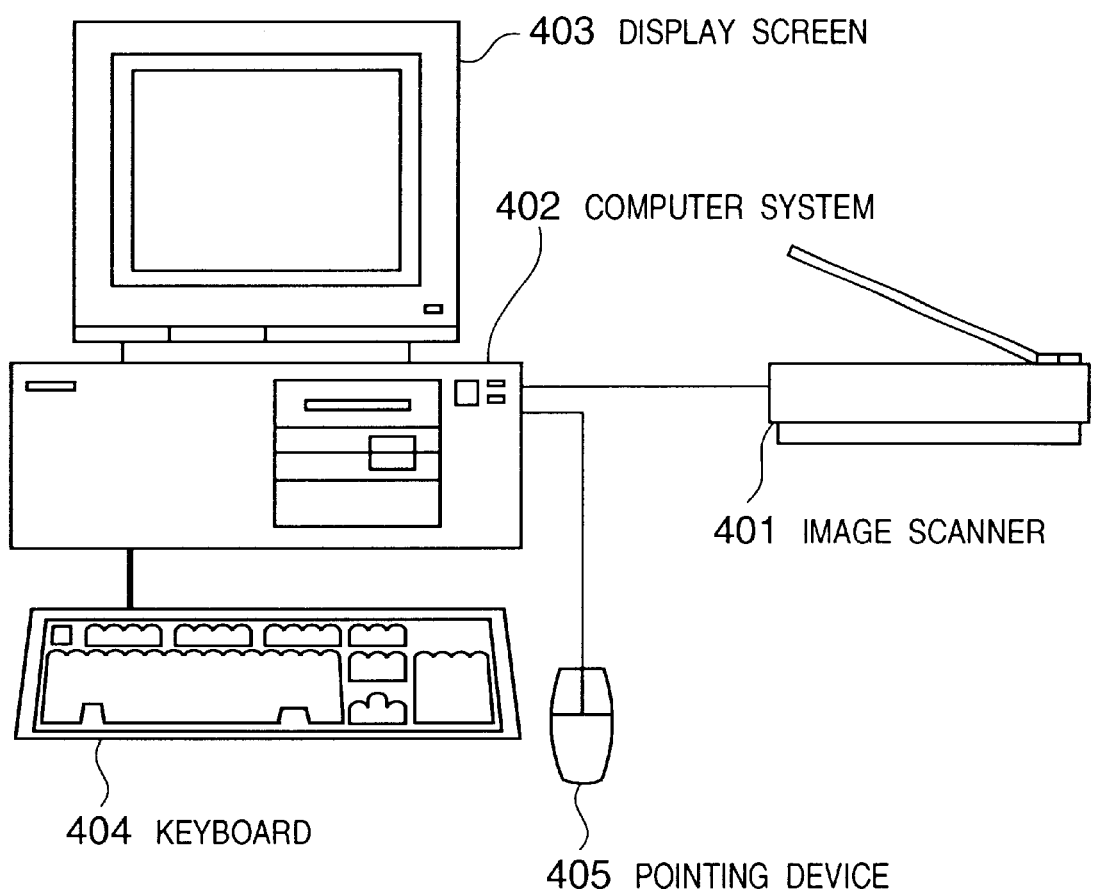
FIG. 6 is an illustration showing the configuration of a system using an image scanner of the present invention.

FIG. 6 shows a system block diagram of this embodiment. As shown in FIG. 6, this system connects with an image scanner 401 and a computer system 402 having a window display function (in which the so-called GUI-based OS is operable).

The computer system 402 is provided with a display screen 403 of a color monitor system or the like, a keyboard 404 for a user to input a command, and a pointing device 405 for designating an object displayed on the screen.

Figure 7:
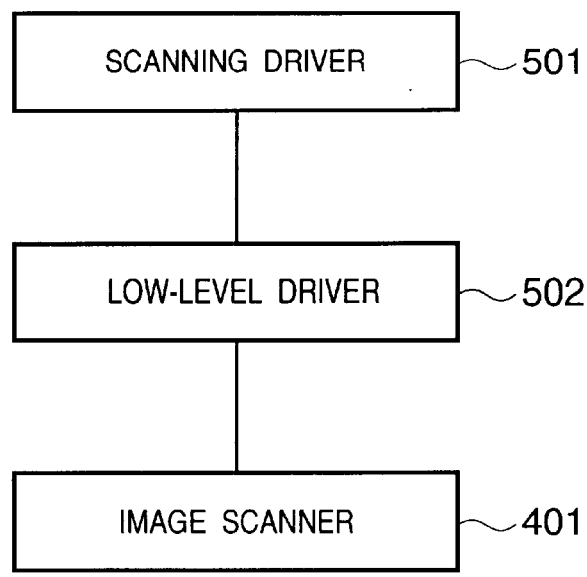
FIG. 7 is an illustration showing the configuration of software for executing a control method of the present invention.

FIG. 7 shows a block diagram of the software of this embodiment. A scanning driver 501 in FIG. 7 is a read driver. A low-level driver 502 is driver software for actual communication with the image scanner 401.

Figure 8:
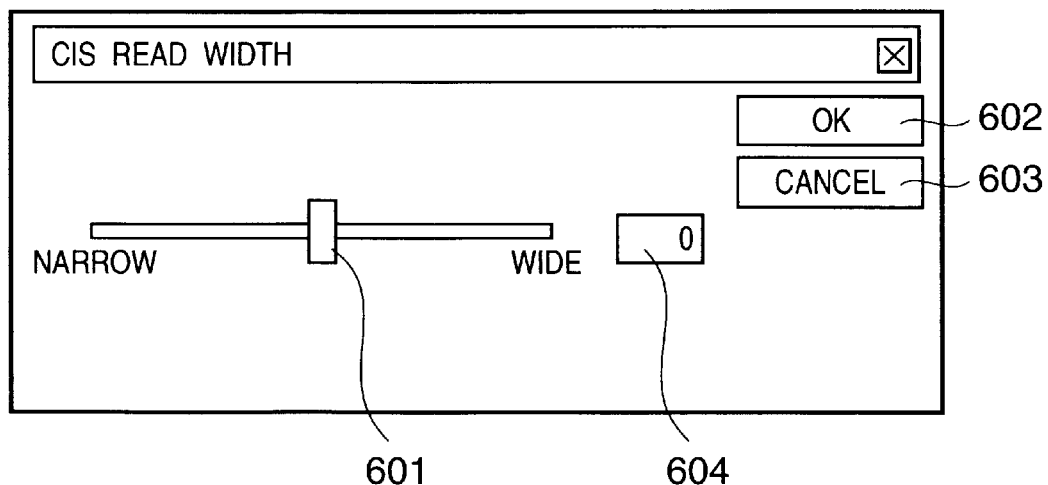
FIG. 8 is an illustration showing a dialog for setting a read range of a CIS.

FIG. 8 shows a dialog for setting the read range of the CIS 101. The dialog is called from, for example, the setting screen of the scanning driver 501. The dialog includes a slide bar 601 for changing read widths of the CIS 101 (reference number 304 in FIGS. 5) from an initial value.

The read width is decreased correspondingly to a moving distance of the slide bar 601 by moving the slide bar 601 leftward with the pointing device 405 or keyboard 403 and increased by moving it rightward. The change value of a read width 304 actually adjusted due to movement of the slide bar 601 is displayed in millimeters on a text box 604.

By designating (clicking) an OK button 602 with the pointing device 405 or pressing a corresponding key on the keyboard, a read range reflecting an adjustment value designated by the dialog is set and stored in a memory of the computer system 402 (not illustrated). When using a cancel button 603, a set value is not changed.

(Operation Control)

Figure 9:
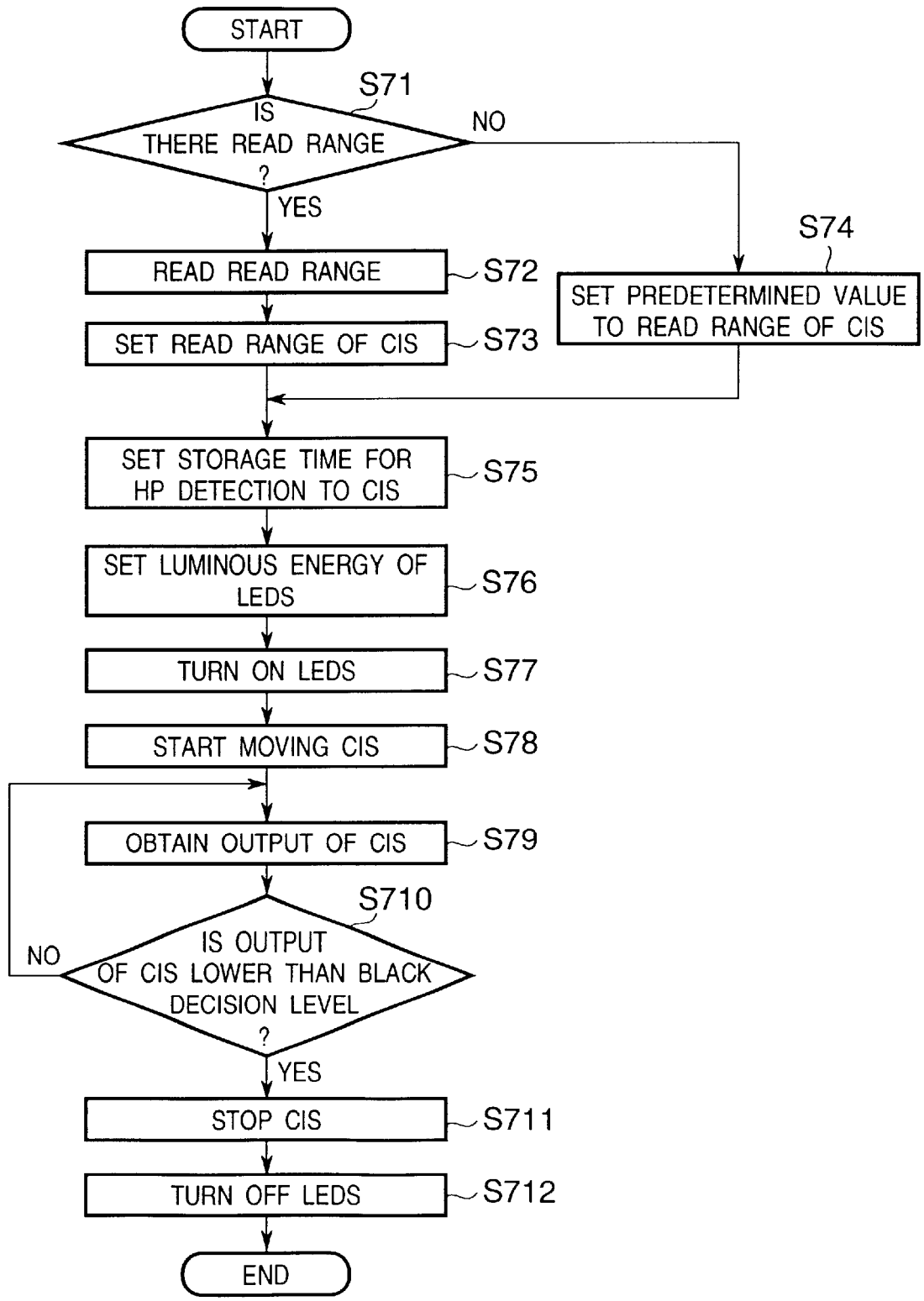
FIG. 9 is a flow chart showing a home-position detection control sequence of the second embodiment.

Then, a method for controlling the image scanner of this embodiment is described below by referring to the operation control sequence flow chart in FIG. 9.

First, in step S71, it is confirmed whether the adjusted read range of the CIS 101 (FIG. 1) is stored in a computer system. Then, step S72 is started when the read range is stored in the computer but step S74 is started unless the read range is stored.

Then, the read range of the CIS 101 is read by the computer system in step S72, the read range of the CIS 101 is set in step S73, and a predetermined value is set to the read range of the CIS 101 in step S74.

Then, the storage time of the CIS 101 for detecting a home position is set in step S75 and the luminous energy of each LED 202 (FIG. 2) is set in step S76.

Each LED 202 is turned on in step S77 and movement of the CIS 101 toward the home position (downward in FIG. 5) is started in step S78 to obtain an output of the CIS 101 in step S79.

Then, the output of the CIS 101 is compared with a level for deciding black in step S710. When the output of the CIS 101 is lower than the black decision level, that is, when a predetermined black decision level is satisfied and a boundary is detected, step S711 is started but step S79 is restarted in a case other than the above.

The CIS 101 is stopped in step S711 and each LED 202 is turned off in step S712 to complete the processing.

Thus, according to this embodiment, even when external light comes in and a bright portion is formed in an image read region, the boundary between a white portion and a black portion can be accurately detected without being influenced by the external light because a portion where the output of an image sensor should become white does not become an output of the image sensor by changing read regions of the image sensor when detecting a read reference position.

(Third Embodiment)

Then, the third embodiment of the present invention is described below.

Figure 10:
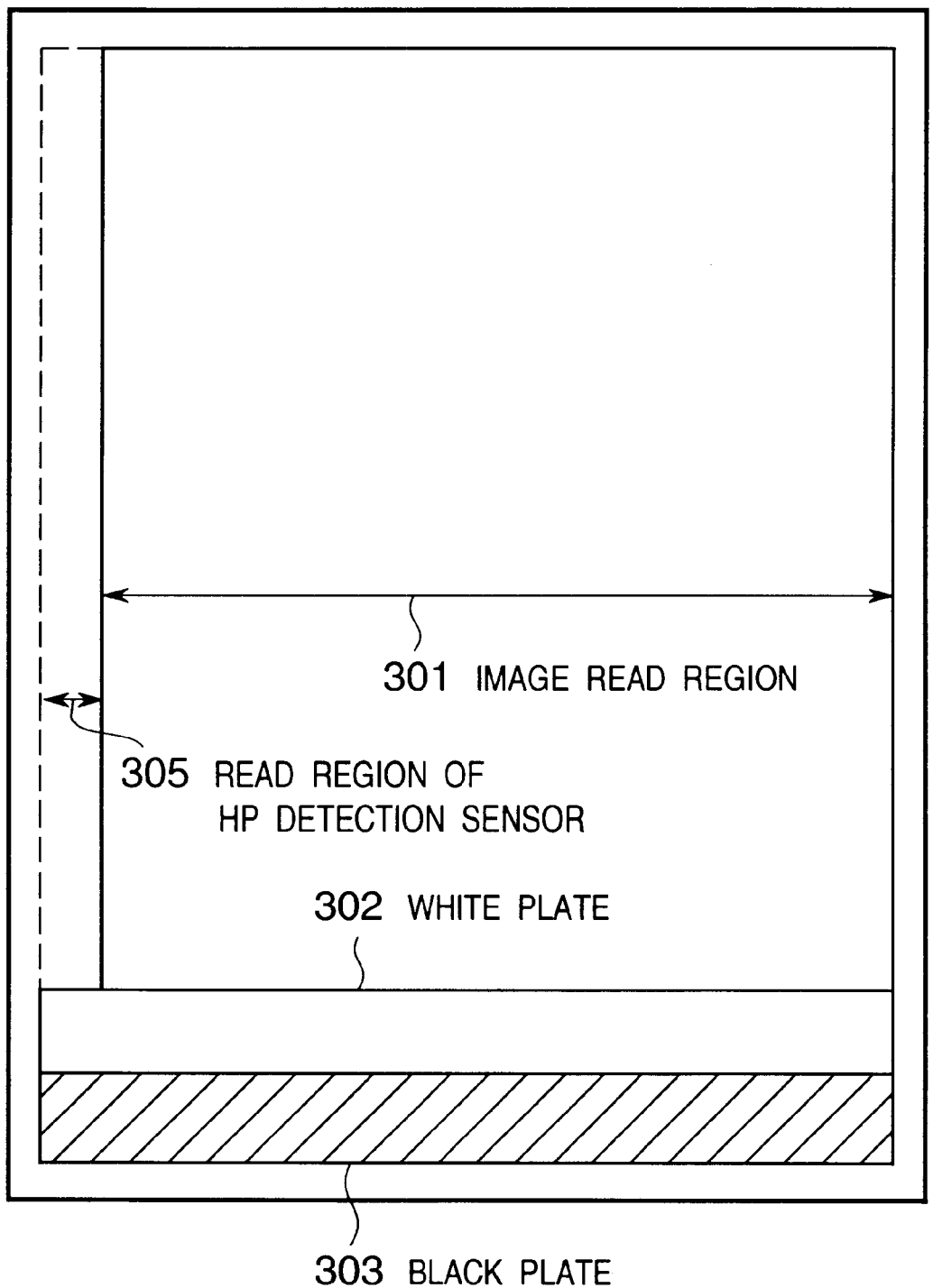
FIG. 10 is an illustration showing the configuration of a home-position detecting section of the image scanner of third embodiment.

FIG. 10 show an illustration viewed from the inside of the image scanner of this embodiment upward (direction of a contact glass 106), in which a component same as that of the first embodiment is provided with the same reference number and its description is omitted. In FIG. 10, reference number 305 denotes a read region of a sensor for detecting a HP, in which the color of the exterior (inside of housing) of the region is read when detecting a HP.

Similarly to the case of the first and second embodiments, this embodiment detects the boundary between the white plate 302 and the black plate 303 in accordance with a video signal output from a line sensor to detect a home position HP serving as a read reference position of an image sensor.

Moreover, the image scanner of this embodiment is used by having the configuration shown in FIG. 6 similarly to the case of the second embodiment and the configuration of software is common to that of the second embodiment.

(Operation Control)

Figure 11:
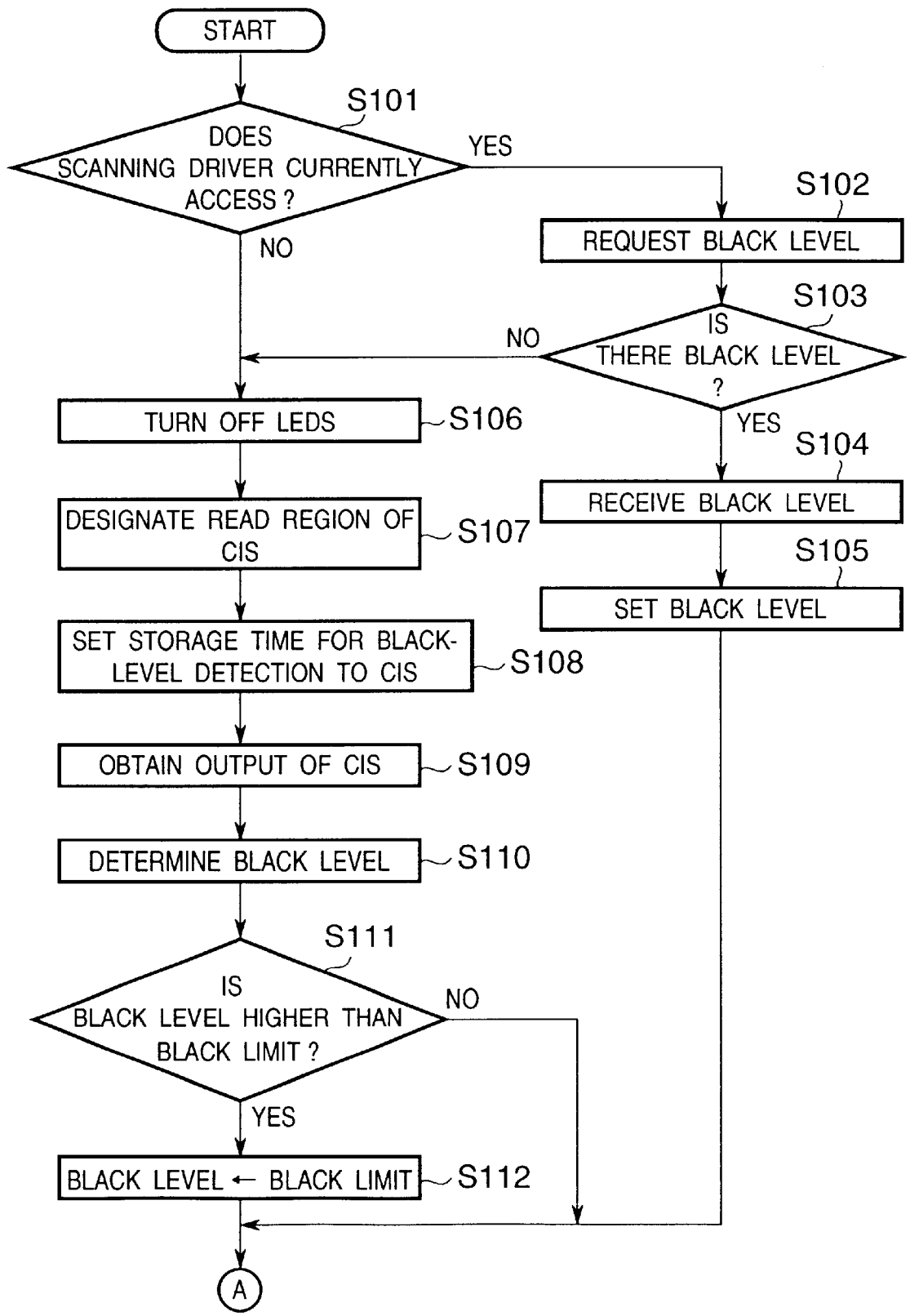
FIGS. 11 to 13 are flowcharts showing a home-position detection control sequence of the third embodiment.
Figure 12:
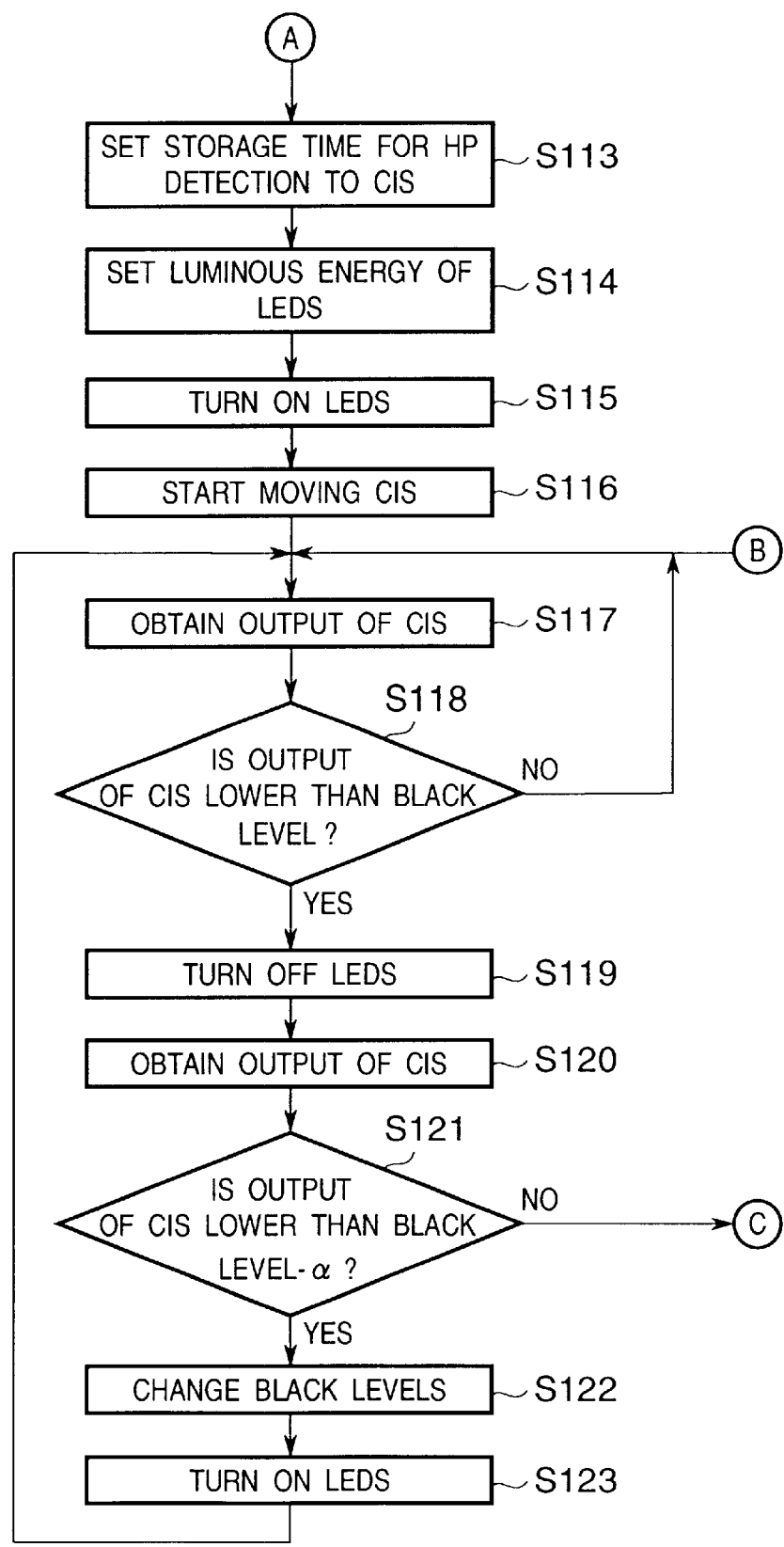
Figure 13:
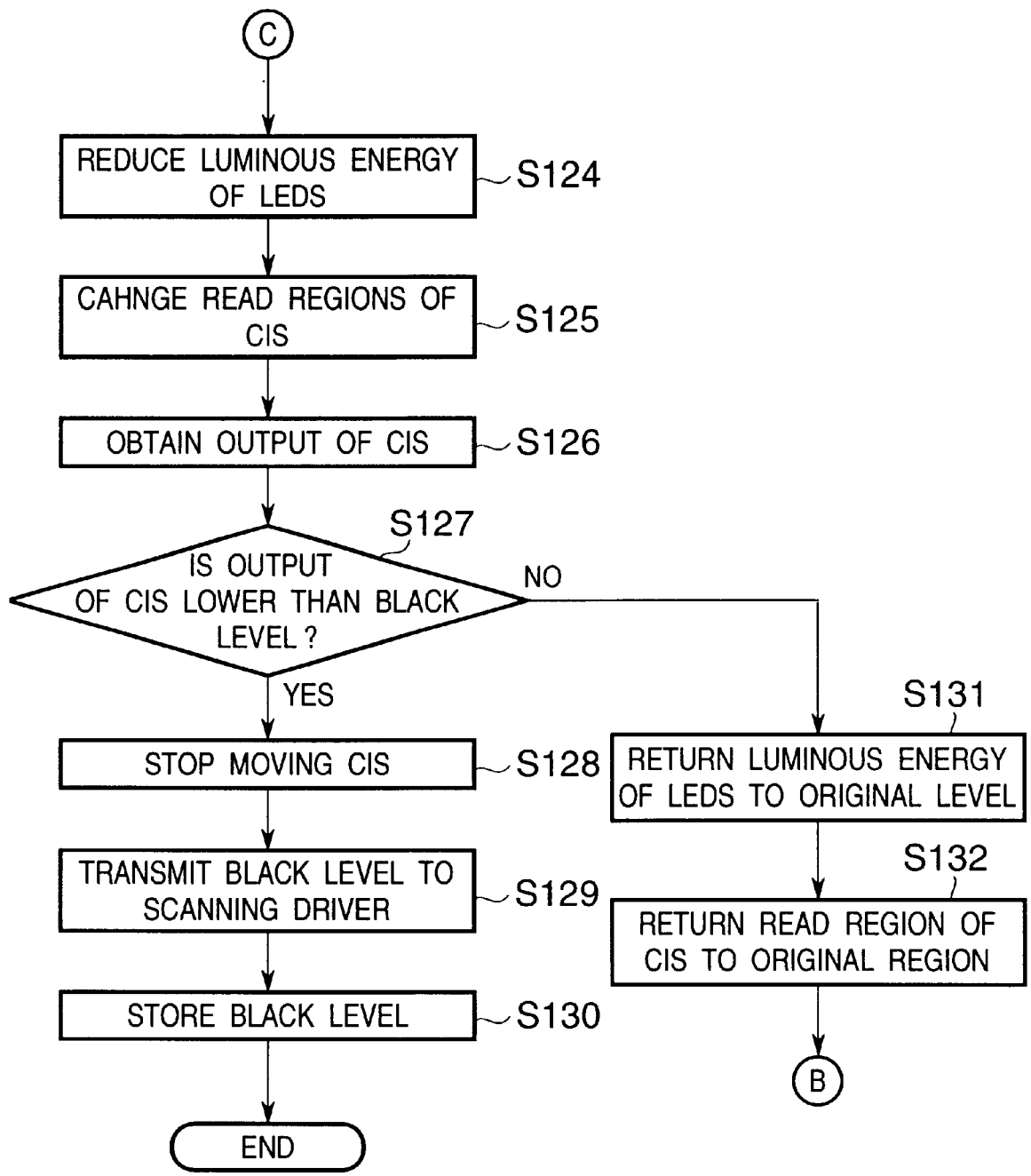

Then, a method for controlling the image scanner of this embodiment is described by referring to operation control sequence flow charts in FIGS. 11 to 13. First, in step S101, it is confirmed whether the scanning driver 501 (FIG. 5) accesses the image scanner 401 (FIG. 4).

Then, when the scanning driver 501 accesses the image scanner 401 in step S101, a black level is requested to the scanning driver 501 in step S102.

In step S103, it is confirmed whether the black level is stored in a external memory (not illustrated). When the black level is stored, the black level is received from the scanning driver in step S104.

Then, in step S105, the value received in step S104 is set as the black level.

When the scanning driver 501 does not access the image scanner 401 in step S101, step S106 is started to turn off the LEDs 202.

The read region of the CIS 101 (FIG. 1) is set so that it becomes the region 305 in FIG. 10 in step S107 and the storage time of the CIS 101 is set to a small value in order to reduce the influence of external light in step S108 to read the region 305 with the CIS 101 and obtain an output of the CIS 101.

In step S110, a black level is detected in accordance with the output of the CIS 101 obtained in step S109.

In step S111, it is confirmed whether the black level detected in step S110 is higher than a predetermined black limit.

When the black level is higher than the black limit in step S111, the detected black level is set to a black level in step S112.

Then, the storage time of the CIS 101 is set to a value larger than the value set in step S108 in step S113 and the luminous energy of each LED 202 is set in step S114.

Each LED 202 is turned on in step S115, movement of the CIS 101 is started in step S116, an output of the CIS 101 is obtained in step S117, the output of the CIS 101 obtained in step S117 is compared with a black level in step S118.

When the output of the CIS 101 is higher than the black level, step S117 is restarted. When the output is lower than the black level, each LED 202 is turned off in step S119 and the output of the CIS 101 is obtained in step S120.

In step S121, the output of the CIS 101 is compared with a value obtained by subtracting a certain value α from the black level. When the output of the CIS 101 is smaller than the value obtained by subtracting a from the black level, the black level is changed to the output of the CIS 101 obtained in step S120 in step S122.

Then, in step S123, each LED 202 is turned on. When the output of the CIS 101 is larger than the value obtained by subtracting α from the black level, the luminous energy of each LED 202 is set to a value smaller than the value set in step S114 in step S124.

The entire read region of the CIS 101 is changed in step S125, the output of the CIS 101 is obtained in step S126, and the output of the CIS 101 is compared with the black level in step S127. When-the output of the CIS 101 is lower than the black level, movement of the CIS 101 is stopped in step S128.

The black level is sent to a scanning driver in step S129 and stored in an external storage unit in step S130.

When the output of the CIS 101 is higher than the black level in step S127, the luminous energy of each LED 202 is returned to the value set in step S114 in step S131 and the read region of the CIS 101 is returned to the value set in step S107 in step S132.

Thus, according to this embodiment, it is possible to accurately detect a read reference position even when a sensor for detecting a reference position is damaged or external light enters the read region of an image scanner.

(Fourth Embodiment)

Then, the fourth embodiment of the present invention is described below.

Figure 14:
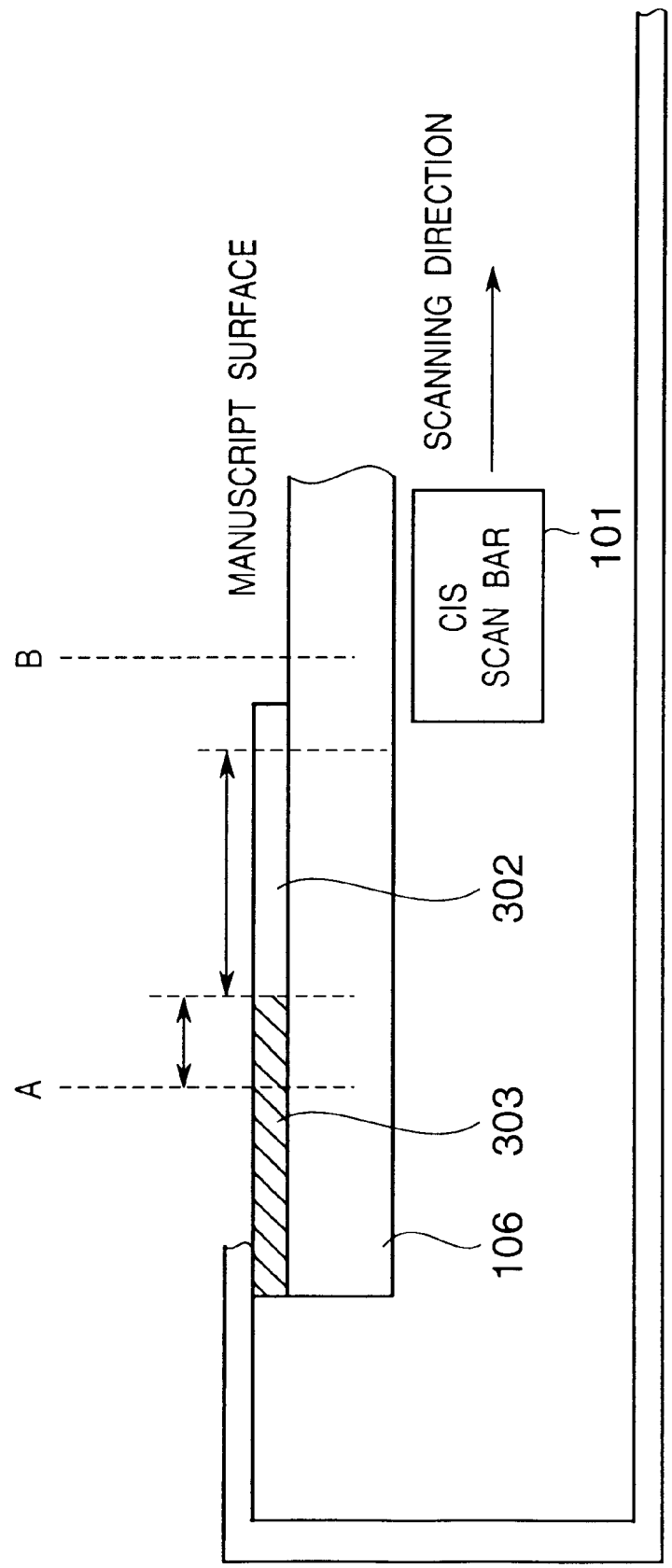
FIG. 14 is an illustration showing the configuration of a home-position detecting section of the image scanner of fourth embodiment.

FIG. 14 is a vertical sectional view showing the configuration of a section for HP detection in the image scanner of this embodiment. In FIG. 14, a component same as that of the first embodiment in FIG. 3 is provided with the same reference number and its description is omitted.

In FIG. 14, reference number 101 denotes a contact-type contact image sensor (hereafter referred to as CIS). Contact glass 106 is set on the CIS 101 and moved in the scanning direction (vertical-scanning direction) shown in FIG. 14 by a driving motor (not illustrated) every line and thereby, image is read.

Moreover, a black region (black plate) 303 and a white region (white plate) 302 are set at the manuscript side of the contact glass 106 at the minus side of a start position B for starting read in the vertical-scanning direction. The black region 303 and white region 302 are used to detect the manuscript read start position B and also required to perform calibration. Detection of the read start position and calibration are performed by reading the regions from the CIS 101. Moreover, a home position A is a position where the CIS 101 waits before read is actually started. In this case, as for this embodiment, the black region 303 and white region 302 shown in FIG. 14 serve as predetermined patterns for the CIS 101 to read images and a detection section for detecting these patterns and a control section for determining the reference position of the CIS 101 in accordance with the detected patterns to make the CIS 101 start reading images are constituted of the CPU 215 (FIG. 2). Moreover, the RAM 215B functions as a storage section for storing the detected patterns and the determined reference position.

Moreover initialization movement of the CIS 101 before reading an image when a power supply is turned on is performed in accordance with a reference position determined by a pattern detected in the vertical-scanning direction and movement of the CIS 101 after reading the image is performed in accordance with a reference position read out of the storage section.

Figure 15:
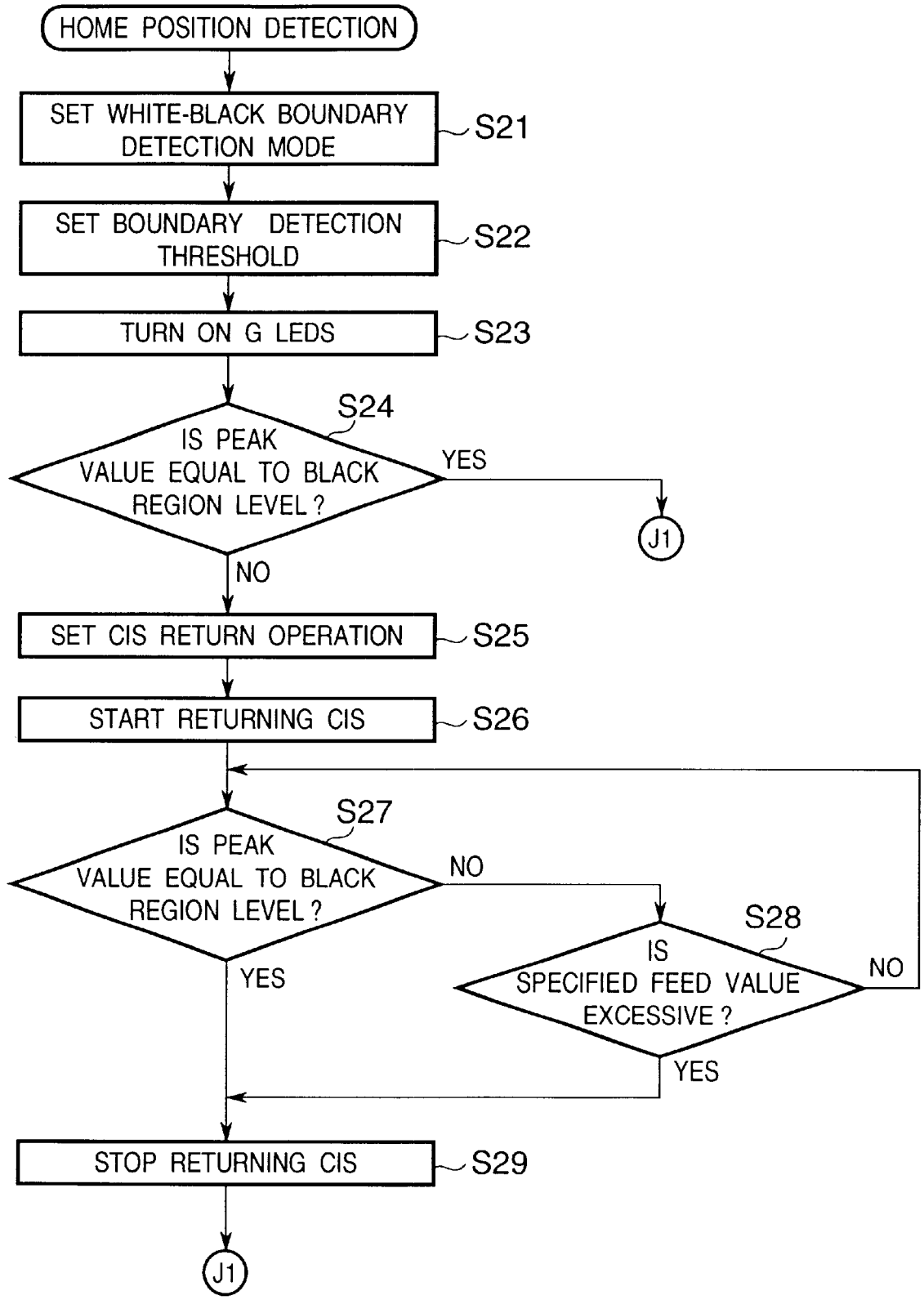
FIGS. 15 and 16 are flowcharts showing the processing for initialization by the fourth embodiment.
Figure 16:
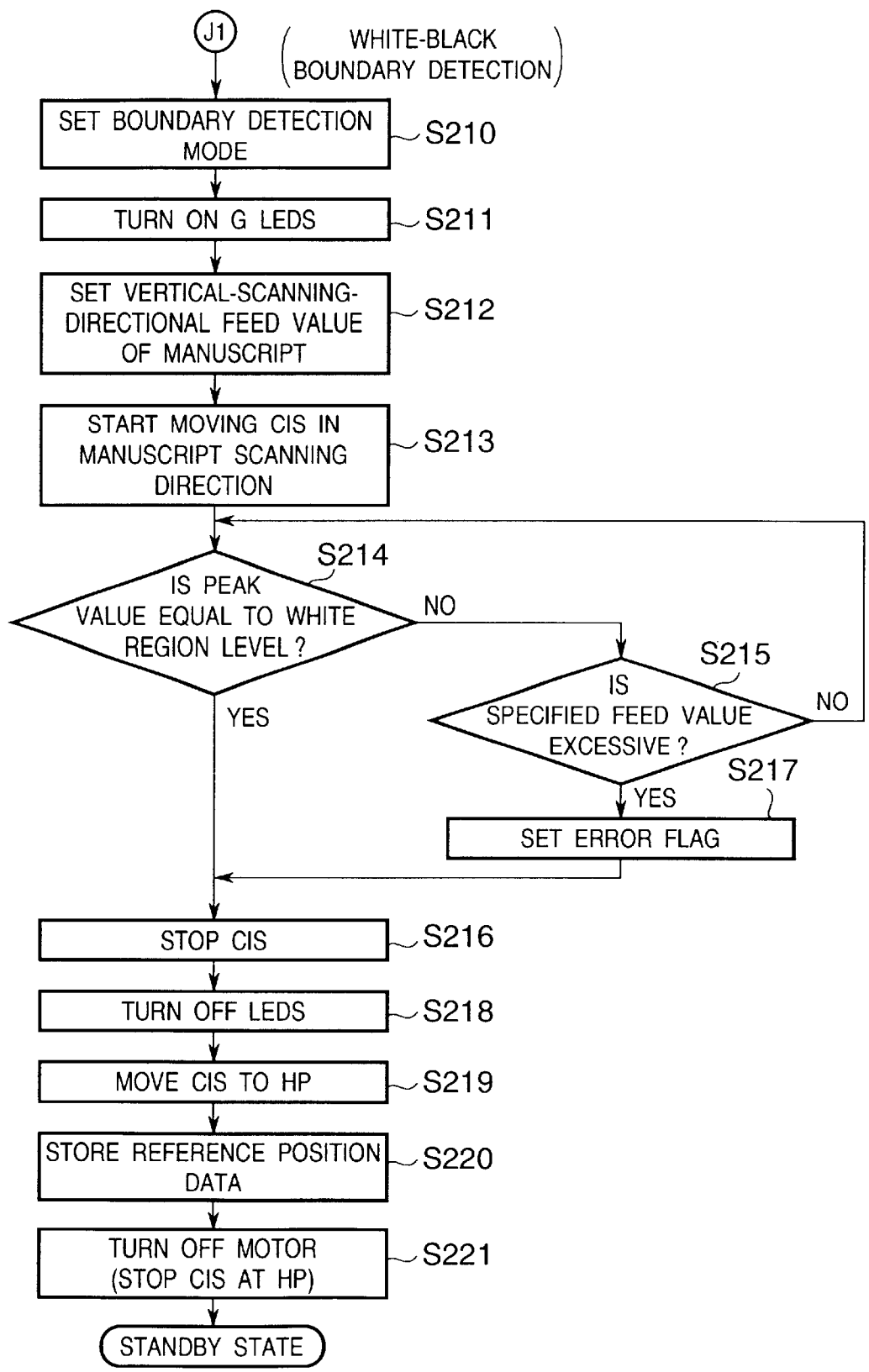

Then, the processes of this embodiment for initialization after a power supply is turned on, that is, detection of the read start position B (detection of home position) is described below by referring to the flow charts in FIGS. 15 and 16.

After a power supply is turned on, the image scanner of this embodiment completes a series of initializing operations and then, detects a home position.

For the home position detection, a mode for detecting the boundary between the black region 303 and the white region 302 shown in FIG. 14 is set in step S21. In this case, the CPU 215 in FIG. 2 sets the CIS 101 and peak detection circuit 208 and moreover sets turn-on timing to the LED driving circuit 203 in the CPU 215.

Then, in step S22, a threshold for detecting the boundary between the black and white regions is determined. This processing is performed in the CPU 215. Then, in step S23, the green (G) LED 202 is turned on in accordance with the turn-on timing set as above described to start boundary detection.

In this case, a peak value is first read by the peak detection circuit 208 to check whether the level of the peak value is equal to a value kept in a range in which the level is decided as a black level equal to or less than the threshold of the black region 303 (step S24). When the peak value is equal to the black level, step S210 for white-black boundary detection is started. Unless the peak value is equal to the black level, step S25 is started. In this case, because the CIS is not returned to the home position A for any reason, the setting for returning the CIS to the home position is performed.

In this case, the CPU 215 transmits a signal to a motor driving circuit (not illustrated) to start returning the CIS (step S26). While the CIS returns, the CPU 215 receives a signal from the peak detection circuit 208 to monitor that the level of the signal reaches the black level (step S27).

Return of the CIS is the setting up to the feed value of size A4 which is the maximum image read width, monitoring in this range is performed while the CIS returns (step S28), and monitoring of the black level is continued so that the above specified feed value is not exceeded.

If the black region is detected, step S29 is started and the CPU 215 stops driving the motor to immediately stop returning the CIS and starts the next pressing.

After the black level is detected, the CPU 215 performs white-black boundary detection in step S210. In this case, the CPU 215 sets a mode for boundary detection. Then, the CPU 215 sets white-level peak detection to the peak detection circuit 208 and moreover sets turn-on timing to the LED driving circuit 203 in the CPU 215.

Then, in step S211, the CPU 215 transmits a turn-on signal to the LED driving circuit 203 again to start peak detection. Then, in step S212, the CPU 215 sets the maximum vertical-scanning feed value for detection (e.g. in a range of 1 to 2 mm) to start movement of the CIS (step S213).

Then, in step S214, the CPU 215 checks whether the peak value reaches the white level. When the peak value does not reach the white level, the CPU 215 checks the feed value specified in step S215. When the feed value does not exceed a range, the CPU 215 repeats the processing in step S214. When the peak value reaches the white level, step S216 is started and the CPU 215 immediately stops the CIS.

Moreover, when the feed value of the CIS exceeds the range, step S216 is started and the CPU 215 stops the CIS. In this case, the CPU 215 sets an error flag in step S217 and communicates that the flag is set to the external unit 213 such as the computer system 402 (FIG. 6) as a home-position detection error through the interface circuit 212.

Then, the CPU 215 turns off the LEDs 202 (step S218) and moves the CIS by a predetermined distance so that the CIS is located at the home position A shown in FIG. 14 in step S219. Then, the CPU 215 stores the position in a data storage section (for example, in the RAM 215B of the CPU 215) as a reference position (step S220), turns off the motor (step S221), and completes the processing. After completing the processing, the CPU 215 becomes a standby state that is a scan wait state.

Figure 17:
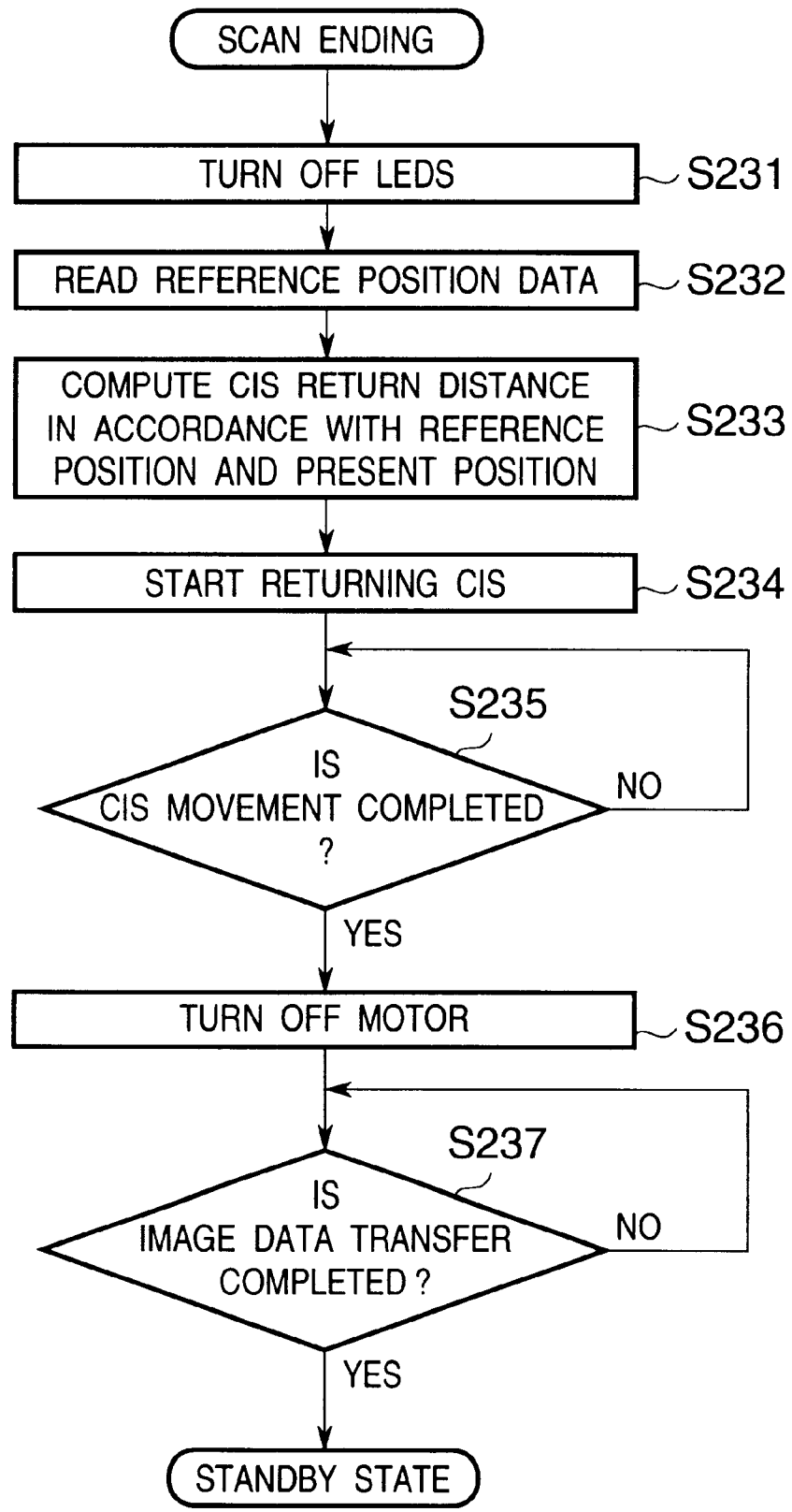
FIG. 17 is a flow chart showing the processing after image read by the fourth embodiment.

Scan can be started from the above standby state. After scan is started, the processing after image read shown in the flow chart in FIG. 17 is started due to completion of scan of a set number of lines or cancel during scan.

That is, when a task bar stops due to completion of scan, the CPU 215 stops driving the LED driving circuit 203 and turns off the LEDs 202 in step S231. Then, the CPU 215 reads the reference position data stored for initialization (step S232), compares the data with the present movement position, and computes a moving distance for returning the CIS to the reference position (step S233). The CPU 215 transmits a motor driving signal to the motor to start moving the CIS in the return direction (step S234).

Then, the CPU 215 drives the motor in accordance with the motor driving signal while counting the moving distance (step S235) and stops the motor driving signal when counting is completed to turn off the motor (step S236). Thereafter, the CPU 215 confirms whether all the read video data is transmitted to the external unit 213 through the interface circuit 212 (step S237), shifts to the standby state when the transmission of the data is completed, and becomes a wait state for start of the next scan.

(Fifth Embodiment)

Then, the fifth embodiment of the present invention is described below by referring to FIGS. 18 and 19. However, because this embodiment is obtained by changing processes after image read, contents already described for the fourth embodiment are not repeatedly described.

Figure 18:
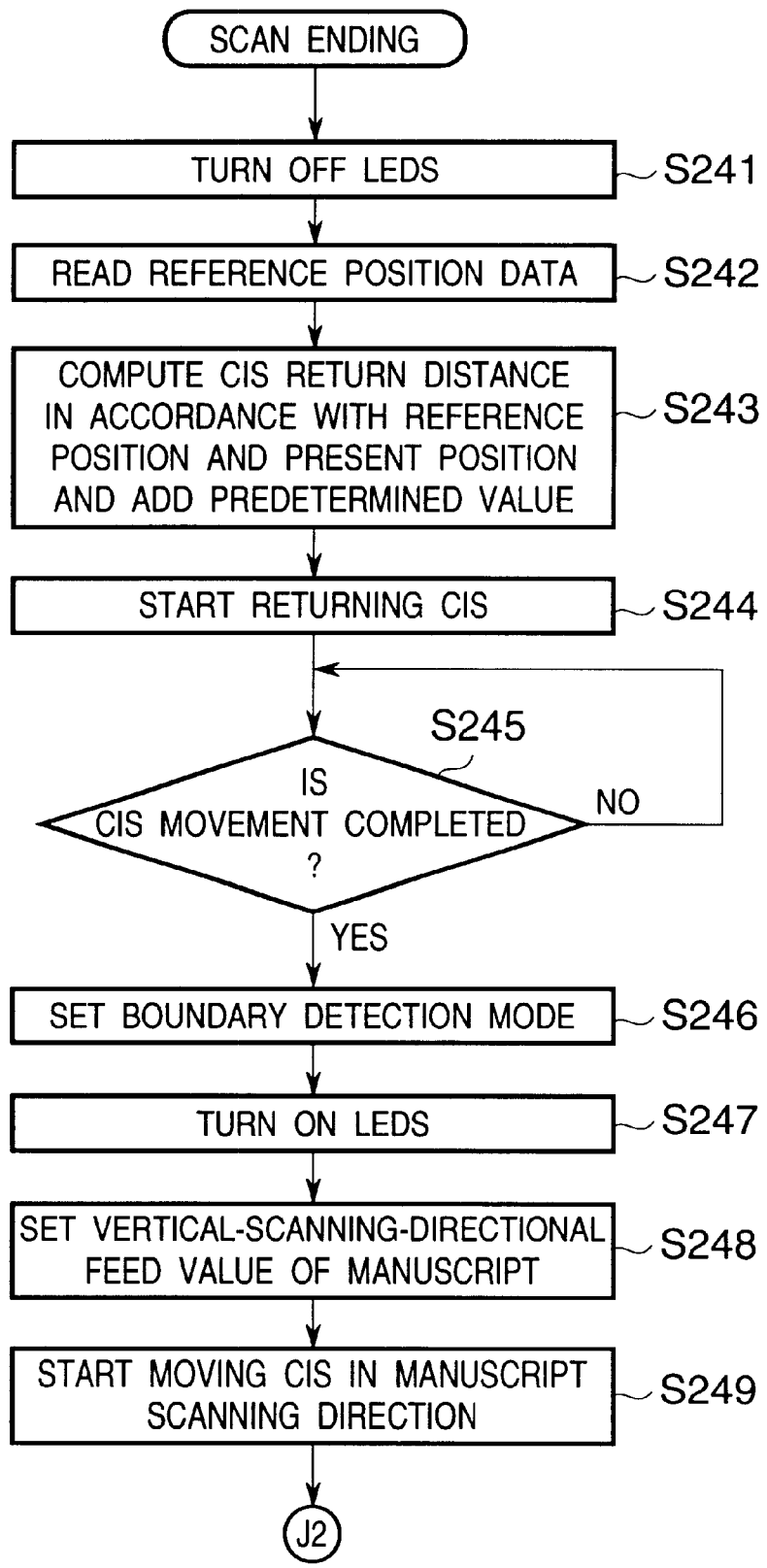
FIGS. 18 and 19 are flowcharts showing the processing after image read by fifth embodiment.
Figure 19:
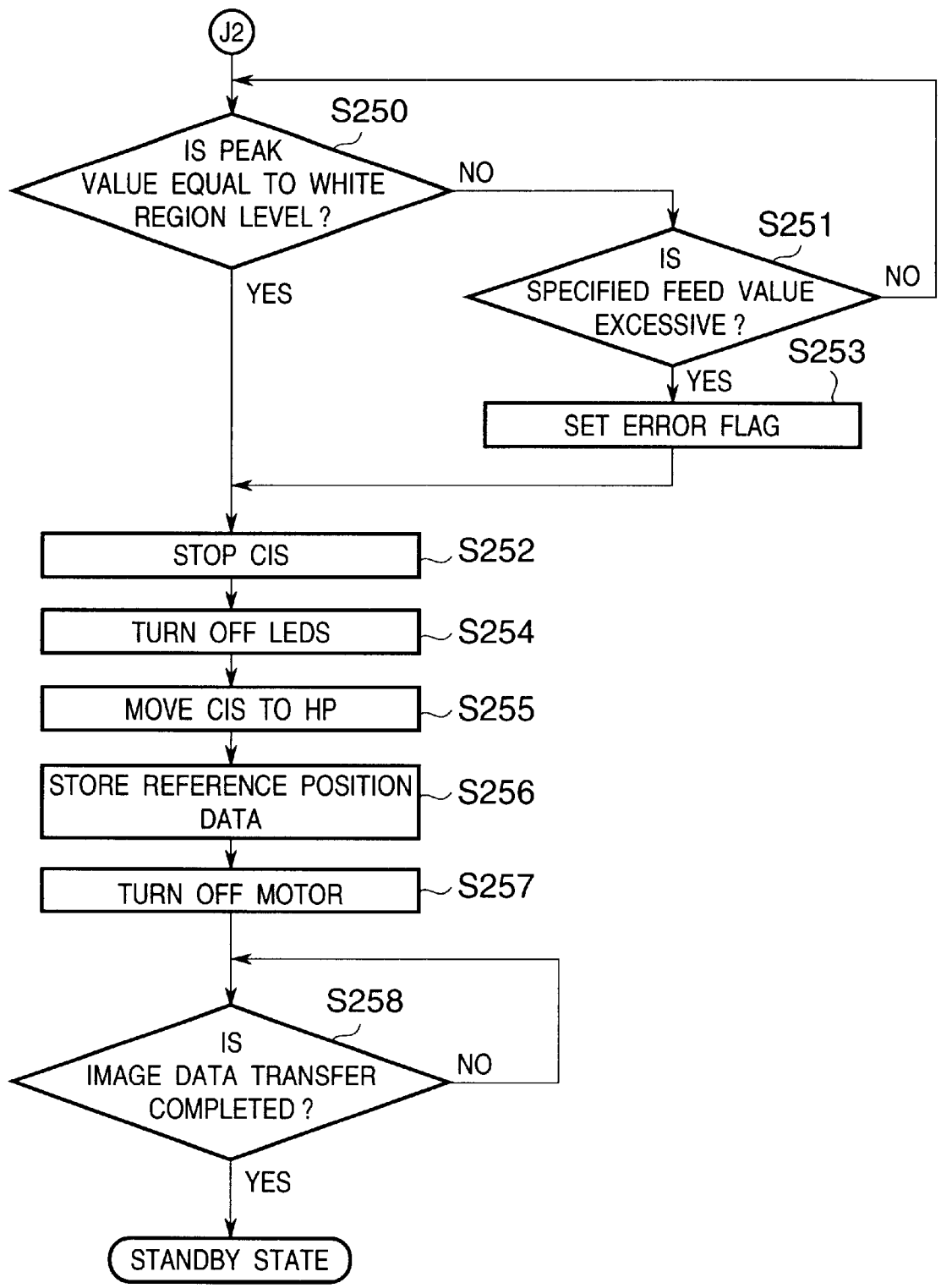

After scan is started, the processes according to the flow chart in FIG. 18 are started due to completion of scan of a set number of lines or cancel during scan.

When a task bar stops due to completion of scan, the CPU 215 stops driving the LED driving circuit 203 to turn off the LEDs 202 in step S241. Then, the CPU 215 reads the reference position data stored for initialization (step S242), compares the data with the present movement position, and computes a moving stance for returning the CIS to the reference position.

In this case, the CPU 215 adds a certain moving distance to the computed moving distance by considering the backlash when driving the motor in the reverse direction or the detection section when detecting the read reference position again (step S243). The CPU 215 transmits a motor driving signal to the motor in accordance with the computed moving distance to start movement of the CIS in the return direction (step S244). Moreover, the CPU 215 drives the motor in accordance with the motor driving signal while counting the moving distance (step S245) to wait for the movement to end in accordance with completion of counting.

Then, in step S246, the CPU 215 starts the white-black boundary detection again in order to detect a reference position when the counting is completed. First, the CPU 215 sets a mode for boundary detection. In this case, the CPU 215 sets white-level peak detection to the peak detection circuit 208 and turn-on timing to the LED driving circuit 203 in the CPU 215.

Then, in step S247, the CPU 215 transmits a turn-on signal to the LED driving circuit 203 again to make the circuit 203 turn on the LEDs 202 and starts peak detection. Then, in step S248, the CPU 215 sets the maximum vertical-scanning feed value (e.g. in a range of 1 to 2 mm) and starts moving the CIS in the manuscript scanning direction (step S249).

Then, in step S250, the CPU 215 checks whether a peak value reaches a white level. When the peak value does not reach the white level, the CPU 215 checks the feed value specified in step S251. When the feedvalue does not exceed a range, the CPU 215 repeats the processing in step S250. When the peak value reaches the white level, step S252 is started and the CPU 215 immediately stops the CIS.

Moreover, when the feed value of the CIS exceeds the range also in step S251, step S252 is started and the CPU 215 stops the CIS. In this case, the CPU 215 sets an error flag (step S253) and notifies-that the flag is set to the external unit 213 as a home-position detection error through the interface circuit 212.

Then, the CPU 215 turns off the LEDs 202 (step S254) and moves the CIS to the home position A shown in FIG. 14 in step S255. The CPU 215 stores the position in a data storage section (in this case, the RAM 215B of the CPU 215) as a reference position (step S256). Then, the CPU 215 turns off the motor (step S257) to complete the processing.

Thereafter, the CPU 215 confirms whether all the read video data is transmitted to the external unit 213 through the interface circuit 212 (step S258), shifts to a standby state when transmission of the data is completed, and becomes a next-scan wait state.

In the case of the fourth and fifth embodiments, the initial position of the CIS 101 is detected only under the initialization after a power supply is turned on and home-position movement is performed in accordance with the information for initially detected position in returning to the home position after moving the CIS to the home position.

Therefore, without using a home-position sensor or even by using an inexpensive sensor in which it is difficult to set a complex pattern for identifying a reference position nearby the reference position, it is possible to detect the reference position so that the CIS 101 does not return to the reference position and reduce the frequency of erroneous detection of the front end of a manuscript.

The control processing shown by the flow charts in FIGS. 15 to 19 can be realized by executing a program stored in the ROM 215A in FIG. 2 with the CPU 215. Moreover, it is possible to store a program for the control processing in a desired storage medium and make the external unit 213 store or read the program in or from the storage medium.

For the above embodiments, a case is described in which the contact image sensor 201 is used as a sensor for reading an image. Moreover, an image scanner using a CCD image sensor serves as effective means.

Furthermore, it is possible to use a mechanism for detecting a home position again in a certain range after movement in accordance with the home position when a power supply is turned on and initialization is performed.

That is, it is also possible to determined a reference position by detecting a pattern again in a predetermined range in the vertical-scanning direction after reading an image and then moving an image sensor to a predetermined position, store the pattern and the reference position in storage means, and move the image sensor in accordance with the reference position.

Moreover, it is possible to determine a reference position by adding an optional moving distance to the moving distance based on a reference position after completing image read to move an image sensor and detecting a mark in a predetermined range in the vertical-scanning direction after moving the image sensor.

Furthermore, when using the CIS 101 constituted of a CMOS, the storage time of the CIS 101 is reduced in order to reduce the influence of external light in step S108 in FIG. 11. However, when using a CIS constituted of the above CCD, it is possible to decide a black level with a dummy output section out of an image region by increasing the storage time of the CIS.

Furthermore, for the sensor read region 305 for HP detection shown in FIG. 10, a case is described in which the exterior of the image scanner 401 (FIG. 4) is white. However, when the exterior is not white, it is also an effective method to attach a white plate to the sensor read region of the exterior of the image scanner 401.

Furthermore, as long as sufficient boundary detection based on CIS outputs is possible, colors of two boards are not limited to white and black.

What is claimed is:

1. A method for controlling an image scanner for detecting a read reference position of an image sensor of the image scanner and reading images from an image read region, wherein the image read region includes a white portion and a black portion which can be read by the image sensor, the method comprising the steps of:

obtaining a first video signal from the image sensor by scanning the image read region with the image sensor in a predetermined direction;

comparing the first video signal with a predetermined black decision level;

detecting a first position where a level of the video signal converted by the image sensor reaches a level satisfying the black decision level for deciding predetermined-density black:

moving the image sensor to a second position separated by a predetermined distance smaller than the width of the black portion in the predetermined direction after the detection of the first position;

obtaining a second video signal from the image sensor at the second position; and determining whether the black decision level is continuously satisfied.

2. The image-scanner control method according to claim 1, further comprising the steps of:

obtaining a third video signal from the image sensor by scanning the image read region with the image sensor to the direction of the white plate after determined that the black decision level is continuously satisfied at said determining step comparing the third video signal with a predetermined white decision level; and detecting the boundary position between the black portion and the white portion where a level of the video signal converted by the image sensor reaches a level satisfying the white decision level for deciding predetermined density white.

3. A storage medium storing a program for controlling an image scanner for detecting a read reference position of an image sensor of the image scanner by detecting a boundary between a white portion and a black portion formed in an image read region which can be read by the image sensor, wherein a program is stored which has the steps of:

obtaining a video signal from the image sensor by scanning the image read region with the image sensor in a predetermined direction;

comparing the video signal with a predetermined black decision level; and detecting a first position where a level of the video signal converted by the image sensor reaches a level satisfying the black decision level for deciding predetermined-density black;

moving the image sensor to a second position separate by a predetermined distance smaller than the width of the black portion in the predetermined direction after the detection of the first position;

obtaining a second video signal from the image sensor at the second position; and determining whether the black decision level is continuously satisfied.

4. A method for detecting a read reference position of an image scanner having an image sensor by detecting a boundary between a white portion and a black portion of an image read region, wherein a read range of the image sensor in a main-scanning direction is made variable to thereby adjust the read range when external light comes into and forms a bright portion in the image read region.

5. The image-scanner control method according to claim 4, wherein the step of setting the read range of the image sensor with an external unit is included.

6. The image-scanner control method according to claim 4, wherein the read range of the image sensor is stored in an external memory.

7. The image-scanner control method according to claim 4, wherein the read range of the image sensor stored in the external memory is read.

8. A storage medium storing a program for detecting a read reference position of an image scanner by detecting a boundary between a white portion and a black portion formed in a region which can be read by an image sensor in a predetermined direction, wherein a program is stored which makes a read range of the image sensor in a main-scanning direction is made variable to thereby adjust the read range when external light comes into and forms a bright portion in the image read region.

9. A method for detecting a read reference position of an image scanner having an image sensor by detecting a boundary between a white portion and a black portion of an image read region, wherein a black level of output of the image sensor is set before detecting the read reference position of the image sensor.

10. The image-scanner control method according to claim 9, wherein the black level of the output of the image sensor for detection of the reference position is determined by determining the storage time of the image sensor in accordance with the type of the image sensor and controlling the storage time of the image sensor.

11. The image-scanner control method according to claim 9, wherein the black level is re-determined when the output of the image sensor is darker than the black level by a certain level or more at the time of detection of the reference position.

12. The image-scanner control method according to claim 9, wherein boundary detection is confirmed by controlling the luminous energy of the lamp (sic) when the boundary between the white portion and the black portion is detected from the black level.

13. The image-scanner control method according to claim 9, wherein boundary detection is confirmed by changing read ranges of the image sensor when the boundary between the white portion and the black portion is detected from the black level.

14. The image-scanner control method according to claim 9, wherein the black level is communicated to and stored in an external memory when the reference position detection is completed.

15. The image-scanner control method according to claim 9, wherein the reference position detection is performed by using the black level stored in the external memory when the black level is stored in the external memory.

16. A storage medium storing a program for controlling an image scanner having an image sensor for converting a read image into an electric video signal, an interface circuit for transferring the video signal, and a white portion and a black portion out of an image read region detecting a read reference position by detecting a boundary between a white portion and a black portion of an image read region, wherein a program is stored which has the step of setting the black level of output of the image sensor before detecting the read reference position of the image sensor thereby enabling a user to detect the read reference position when a sensor for detecting the reference position is damaged.

17. An image scanner for reading an image from a manuscript by moving an image sensor in a vertical-scanning direction, comprising:
   a detector that detects a predetermined pattern for the image sensor;
   a controller that determines a reference position of the image sensor in accordance with the detected pattern, wherein the reference position is used as a standby position by the image sensor before reading the image and also used to determine a read start position where the image sensor actually starts to read the image; and
   a memory that stores the determined reference position, wherein the image sensor initially moves from the reference position to the read start position when a power supply is turned on and returns to the reference position after reading the image.

18. The image scanner according to claim 17, wherein the pattern is present at the read start position of the image sensor or nearby the position.

19. The image scanner according to claim 17, wherein an A/D converter that converts an analog video signal from the image sensor into a digital video signal and interface circuit that transfers the converted digital video signal to an external unit are included.

20. The image scanner according to claim 17, wherein image read is started at a predetermined position based on a reference position.

21. The image scanner according to claim 17, wherein the image sensor is moved to a predetermined position after image read, a pattern is detected again in a predetermined range in the vertical-scanning direction to determine a reference position, the pattern and the reference position are stored in the memory, and the image sensor is moved in accordance with the reference position.

22. The image scanner according to claim 17, wherein the image sensor is moved by adding an optional moving distance to the moving distance based on a reference position after image read and the pattern is detected in a predetermined range in the vertical-scanning direction after movement of the image sensor is completed to determine the reference position.

23. An image read method for reading an image from a manuscript by moving an image sensor in a vertical-scanning direction, the method comprising the steps of:
   detecting a predetermined pattern formed for the image sensor;
   determining a reference position of the image sensor in accordance with the detected pattern, wherein the reference position is used as a standby position by the image sensor before reading the image and also used to determine a read start position where the image sensor actually starts to read the image;
   storing the determined reference position in accordance with the detected pattern in the vertical-scanning direction;
   performing initialization movement of the image sensor from the reference position to the read start position before image read when a power supply is turned on; and
   performing a return movement of the image sensor to the reference position after reading the image.

24. The image read method according to claim 23, wherein the pattern is present at the read start position of the image sensor or nearby the position.

25. The image read method according to claim 23, wherein image read is started at a predetermined position in accordance with a reference position.

26. The image read method according to claim 23, wherein the image sensor is moved to a predetermined position after image read, then a pattern is detected again in a predetermined range in the vertical-scanning direction to determine a reference position, the reference position is stored in a memory, and the image sensor is moved in accordance with the reference position.

27. The image read method according to claim 23, wherein the image sensor is moved by adding an optional moving distance to the moving distance based on a reference position after image read and the pattern is detected in a predetermined range in the vertical-scanning direction after movement of the image sensor is completed to determine a reference position.

28. A storage medium storing a program for reading an image from a manuscript by moving an image sensor in a vertical-scanning direction, wherein said program detects a predetermined pattern for the image sensor to read the image, determines a reference position of the image sensor in accordance with the detected pattern wherein the reference position is used as a standby position by the image sensor before reading the image and also used to determine a read start position where the image sensor actually starts to read the image, stores the determined reference position in accordance with the detected pattern in the vertical-scanning direction, performs initialization movement of the image sensor from the reference position to the read start position before image read when a power supply is turned on, and performs a return movement of the image sensor to the reference position after reading the image.

29. The storage medium according to claim 28, wherein a program is stored which converts an analog video signal read by the image sensor into a digital video signal and transfers the converted digital video signal to an external unit.

30. The storage medium according to claim 28, wherein a program is stored which starts reading images at a predetermined position based on a reference position.

31. The storage medium according to claim 28, wherein a program is stored which moves the image sensor to a predetermined position after image read, then detects a pattern again in a predetermined range in the vertical-scanning direction to determine a reference position, stores the reference position in a memory, and moves the image sensor in accordance with the reference position.

32. The storage medium according to claim 28, wherein a program is stored which moves the image sensor by adding an optional moving distance to the moving distance based on a reference position after image read and further detects the pattern in a predetermined range in the vertical-scanning direction after movement of the image sensor is completed to determine a reference position.

* * * * *